(12) United States Patent
Aoki et al.

(10) Patent No.: US 7,453,668 B2
(45) Date of Patent: Nov. 18, 2008

(54) THIN FILM MAGNETIC HEAD, METHOD OF MANUFACTURING THE SAME, AND MAGNETIC RECORDING APPARATUS

(75) Inventors: Susumu Aoki, Tokyo (JP); Reiichi Kurumisawa, Tokyo (JP); Norikazu Ota, Tokyo (JP); Yasuyuki Notsuke, Tokyo (JP); Yuichi Watabe, Tokyo (JP)

(73) Assignee: TDK Corporation, Tokyo (JP)

( * ) Notice: Subject to any disclaimer, the term of this patent is extended or adjusted under 35 U.S.C. 154(b) by 386 days.

(21) Appl. No.: 11/252,038

(22) Filed: Oct. 18, 2005

(65) Prior Publication Data

US 2006/0126222 A1 Jun. 15, 2006

(30) Foreign Application Priority Data

Oct. 20, 2004 (JP) ............................. 2004-305853

(51) Int. Cl.
*G11B 5/127* (2006.01)
(52) U.S. Cl. ............................. 360/125.24; 360/125.21; 29/603.15
(58) Field of Classification Search ................ 360/125.02–125.32, 123.09, 123.12, 125.42
See application file for complete search history.

(56) References Cited

U.S. PATENT DOCUMENTS

| 7,239,478 | B1 * | 7/2007 | Sin et al. ................. 360/125.3 |
| 2005/0068671 | A1 * | 3/2005 | Hsu et al. ................... 360/125 |
| 2005/0105215 | A1 * | 5/2005 | Matono ...................... 360/126 |
| 2005/0280938 | A1 * | 12/2005 | Sasaki et al. ................ 360/126 |
| 2006/0044677 | A1 * | 3/2006 | Li et al. ....................... 360/122 |

FOREIGN PATENT DOCUMENTS

| EP | 0 360 978 A2 | 1/1990 |
| JP | A-04-129016 | 4/1992 |
| JP | A-2001-155309 | 6/2001 |
| JP | A 2001-250204 | 9/2001 |
| JP | A-2004-281017 | 10/2004 |

* cited by examiner

*Primary Examiner*—William J Klimowicz
(74) *Attorney, Agent, or Firm*—Oliff & Berridge, PLC

(57) ABSTRACT

The present invention provides a method of manufacturing a thin film magnetic head capable of assuring recording characteristics by determining throat height with high precision. A TH specifying layer is formed so as to extend to a position P1 while being adjacent to a gap layer, and an auxiliary insulating layer is similarly formed so as to extend from the position P1 while being adjacent to the gap layer and specify throat height on the basis of the position P1. After that, a main insulating layer is formed so as to cover a thin film coil on the auxiliary insulating layer, and a yoke layer is formed so as to extend while being partially on the TH specifying layer. The throat height is determined accurately and stably on the basis of the position P1 by the auxiliary insulating layer.

6 Claims, 12 Drawing Sheets

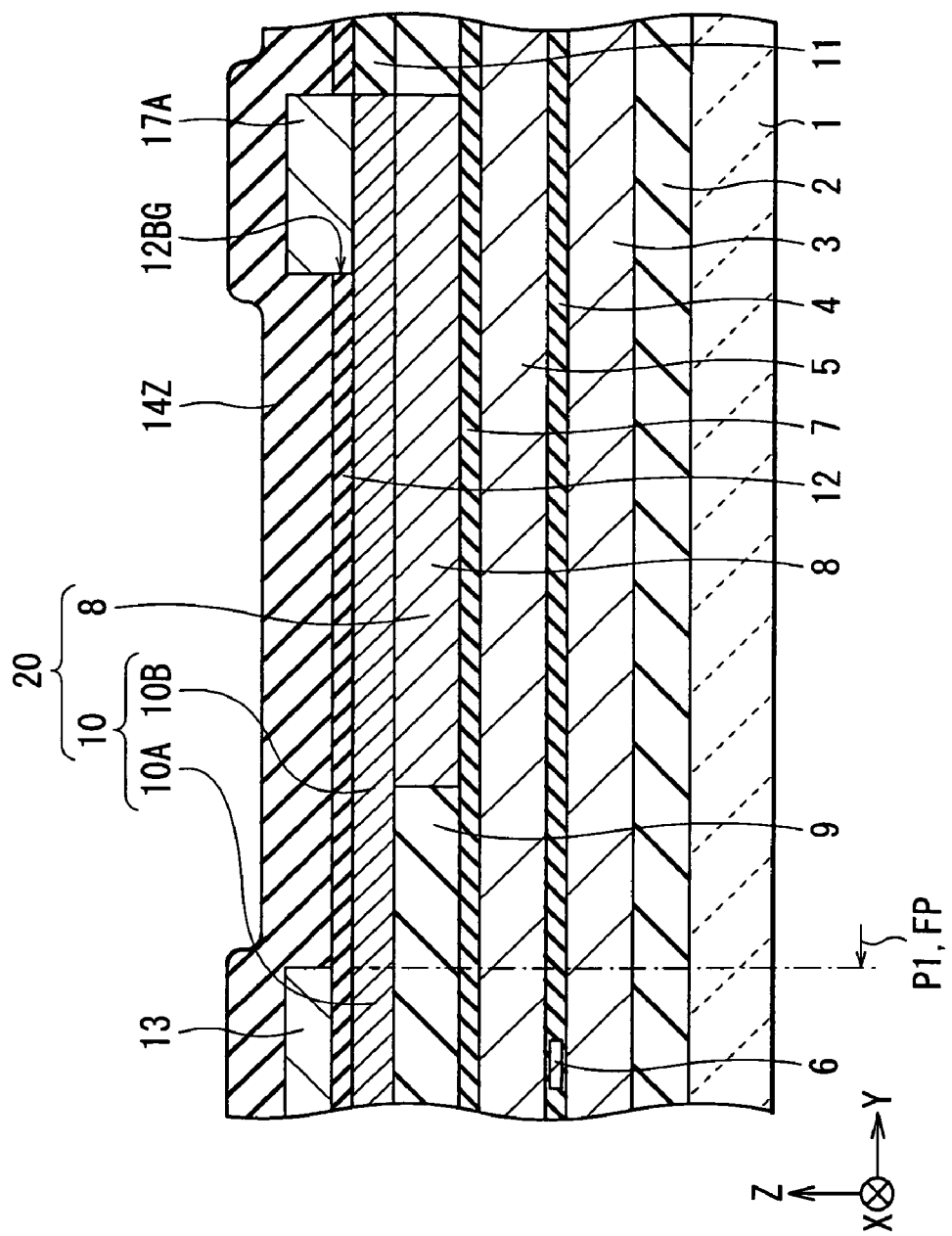
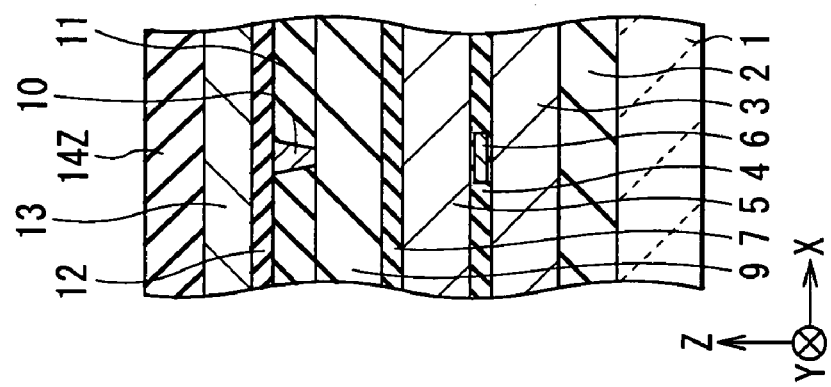
FIG. 5B
FIG. 5A

THIN FILM MAGNETIC HEAD, METHOD OF MANUFACTURING THE SAME, AND MAGNETIC RECORDING APPARATUS

BACKGROUND OF THE INVENTION

Field of the Invention

The present invention relates to a thin film magnetic head having at least an inductive magnetic transducer for recording, a method of manufacturing the same, and a magnetic recording apparatus on which the thin film magnetic head is mounted.

In recent years, in association with improvement in surface recording density of a magnetic recording medium such as a hard disk (hereinbelow, simply called "recording medium"), improvement in performance of a thin film magnetic head to be mounted on a magnetic recording apparatus such as a hard disk drive is in demand. Known recording methods of a thin film magnetic head include, for example, a longitudinal recording method in which the orientation of a signal magnetic field is set to an in-plane direction (longitudinal direction) of a recording medium and a perpendicular recording method in which the orientation of a signal magnetic field is set to a direction orthogonal to the surface of a recording medium. At present, the longitudinal recording method is widely used. However, when a market trend accompanying improvement in surface recording density is considered, it is assumed that, in place of the longitudinal recording method, the perpendicular recording method will be regarded as a promising method in future for the following reason. The perpendicular recording method has advantages such that high linear recording density can be assured and a recorded hard disk is not easily influenced by thermal fluctuations.

A thin film magnetic head of the perpendicular recording method has, for example, a thin film coil for generating a magnetic flux for recording and a magnetic pole layer extending rearward from the air bearing surface and generating a magnetic field (perpendicular magnetic field) for magnetizing a recording medium on the basis of the magnetic flux generated by the thin film coil. Specifically, as a thin film magnetic head of the perpendicular recording method in these days, for example, a thin film magnetic head having a write shield layer for suppressing spread of a magnetic flux emitted from the magnetic pole layer in order to prevent a recording track width in a recording medium from unintentionally increasing is becoming mainstream. The write shield layer extends rearward from the air bearing surface so as to be isolated from the magnetic layer via a gap layer on the side close to the air bearing surface and to be magnetically coupled to the magnetic pole layer via a back gap on the side far from the air bearing surface. As a thin film magnetic head of this kind, for example, a thin film magnetic head in which a write shield layer is disposed on the trailing side of the magnetic pole layer is known (refer to, for example, Japanese Patent Laid-open No. 2001-250204, and European Patent Application No. 0360978). In the thin film magnetic head of the perpendicular recording method having the write shield, when a magnetic flux for recording is emitted from the magnetic pole layer at the time of recording information, spread of the magnetic flux is suppressed by the write shield layer, so that a recording track width on the recording medium is prevented from expanding unintentionally.

To assure recording characteristics of the thin film magnetic head of the perpendicular recording method having the write shield layer, for example, it is necessary to assure both of sufficient magnetic field strength and sharp slope of the magnetic field strength by determining the throat height with high precision, as one of important factors that determine recording performance. In the conventional thin film magnetic head of the perpendicular recording method, however, considering the today's technical background in which a demand for largely shortening the throat height to about 0.3 μm or less in order to improve the recording characteristics is increasing, there is still a room for improvement from the viewpoint of determining the throat height with high precision. Concretely, for example, in the case of using a material displaying flowability when heated such as photoresist as the material for forming an insulating layer for specifying the throat height, that is, an insulating layer in which a thin film coil is buried, the position of formation of the insulating layer tends to shift due to fluctuations in the flow state of the photoresist. Consequently, it is difficult to determine the throat height with high precision. Therefore, also in the case of largely shortening the throat height to about 0.3 μm or less to improve the performance of the thin film magnetic head of the perpendicular recording method having the write shield layer, establishment of a technique capable of accruing the recording characteristics by determining the throat height with high precision is in demand.

The present invention has been achieved in view of such problems and a first object of the invention is to provide a thin film magnetic head in which the recording characteristics are assured by determining the throat height with high precision.

A second object of the invention is to provide a method of manufacturing a thin film magnetic head capable of assuring the recording characteristics by determining the throat height with high precision.

Further, a third object of the invention is to provide a magnetic recording apparatus on which a thin film magnetic head whose throat height is determined with high precision is mounted and in which the recording characteristics are assured.

SUMMARY OF THE INVENTION

A thin film magnetic head according to the invention includes: a thin film coil for generating a magnetic flux; a magnetic pole layer extending rearward from a recording-medium-facing surface that faces a recording medium traveling in a medium travel direction and generating a magnetic field for magnetizing the recording medium in a direction orthogonal to the face of the recording medium on the basis of the magnetic flux generated by the thin film coil; a magnetic shield layer which extends rearward from the recording-medium-facing surface so as to be separated from the magnetic pole layer by a gap layer on the side close to the recording-medium-facing surface and connected to the magnetic pole layer via a back gap on the side far from the recording-medium-facing surface, and which includes a first magnetic shield layer portion extending rearward from the recording-medium-facing surface to a first position while being adjacent to the gap layer, and a second magnetic shield layer portion extending rearward from the recording-medium-facing surface to at least the back gap while extending partially on the first magnetic shield layer portion; and an insulating layer including a first insulating layer portion which extends rearward from the first position while being adjacent to the gap layer, constructs a flat surface together with the first magnetic shield layer portion, and specifies throat height on the basis of the first position, and a second insulating layer portion which extends rearward from a second position that is receding from the first position while being adjacent to the flat surface in the first insulating layer portion, and covers the thin film coil.

In the thin film magnetic head according to the invention, the insulating layer is constructed so as to include the first insulating layer portion which extends rearward from the first position while being adjacent to the gap layer and specifies the throat height on the basis of the first position, and the second insulating layer portion which extends rearward from a second position that is receding from the first position while being adjacent to the flat surface in the first insulating layer portion, and covers the thin film coil, and the magnetic shield layer is constructed so as to include the first magnetic shield layer portion extending rearward from the recording-medium-facing surface to a first position while being adjacent to the gap layer, and the second magnetic shield layer portion extending rearward from the recording-medium-facing surface to at least the back gap while extending partially on the first magnetic shield layer portion. The throat height is specified accurately and stably on the basis of the first position by the first insulating layer portion.

The present invention also provides a method of manufacturing a thin film magnetic head according to the invention, including: a thin film coil for generating a magnetic flux; a magnetic pole layer extending rearward from a recording-medium-facing surface that faces a recording medium traveling in a medium travel direction and generating a magnetic field for magnetizing the recording medium in a direction orthogonal to the face of the recording medium on the basis of the magnetic flux generated by the thin film coil; a magnetic shield layer which extends rearward from the recording-medium-facing surface so as to be separated from the magnetic pole layer by a gap layer on the side close to the recording-medium-facing surface and connected to the magnetic pole layer via a back gap on the side far from the recording-medium-facing surface; and an insulating layer specifying throat height and covering the thin film coil, wherein a step of forming the magnetic shield layer and the insulating layer comprises: a first step of forming a first magnetic shield layer portion constructing a part of the magnetic shield layer so as to extend rearward from the recording-medium-facing surface to a first position on the gap layer in which the back gap is provided while being adjacent to the gap layer; a second step of forming a first insulating layer portion constructing a part of the insulating layer so as to extend rearward from the first position while being adjacent to the gap layer, to construct a flat surface together with the first magnetic shield layer portion, and to specify the throat height on the basis of the first position; a third step of forming the insulating layer so as to include the first insulating layer portion and a second insulating layer portion by forming the second insulating layer portion constructing another part of the insulating layer so as to extend rearward while being adjacent to the flat surface in the first insulating layer portion and to cover the thin film coil; and a fourth step of forming the magnetic shield layer so as to include the first magnetic shield layer portion and a second magnetic shield layer portion by forming the second magnetic shield layer portion constructing another part of the magnetic shield layer so as to extend rearward from the recording-medium-facing surface to at least the back gap while being on the first magnetic shield layer portion.

In the method of manufacturing a thin film magnetic head according to the invention, the first magnetic shield layer portion is formed so as to extend rearward from the recording-medium-facing surface to a first position while being adjacent to the gap layer, and the first insulating layer portion is formed so as to extend rearward from the first position while being adjacent to the gap layer and specify the throat height on the basis of the first position. After that, the second insulating layer portion is constructed so as to extend rearward while being adjacent to the flat surface in the first insulating layer portion and to cover the thin film coil, and the second magnetic shield layer portion is formed so as to extend rearward from the recording-medium-facing surface to at least the back gap while partially being on the first magnetic shield layer portion. In such a manner, the magnetic shield layer is formed so as to include the first and second magnetic shield layer portions, and the insulating layer is formed so as to include the first and second insulating layer portions. In this case, the throat height is specified on the basis of the first position by the first insulating layer portion, so that the throat height coincides with a target value. Specifically, for example, when the first insulating layer portion is formed by using an inorganic insulating material which does not display flowability when heated, the throat height is unconditionally specified on the basis of the first position by the first insulating layer portion, so that the throat height coincides with the target value. Thus, the throat height is specified accurately and stably on the basis of the first position by the first insulating layer portion.

The present invention also provides a magnetic recording apparatus on which a recording medium traveling in a medium travel direction and a thin film magnetic head for performing magnetic process on the recording medium are mounted. The thin film magnetic head includes: a thin film coil for generating a magnetic flux; a magnetic pole layer extending rearward from a recording-medium-facing surface that faces a recording medium traveling in a medium travel direction and generating a magnetic field for magnetizing the recording medium in a direction orthogonal to the face of the recording medium on the basis of the magnetic flux generated by the thin film coil; a magnetic shield layer which extends rearward from the recording-medium-facing surface so as to be separated from the magnetic pole layer by a gap layer on the side close to the recording-medium-facing surface and connected to the magnetic pole layer via a back gap on the side far from the recording-medium-facing surface, the magnetic shield layer including a first magnetic shield layer portion extending rearward from the recording-medium-facing surface to a first position while being adjacent to the gap layer, and a second magnetic shield layer portion extending rearward from the recording-medium-facing surface to at least the back gap while extending partially on the first magnetic shield layer portion; and an insulating layer including a first insulating layer portion which extends rearward from the first position while being adjacent to the gap layer, constructs a flat surface together with the first magnetic shield layer portion, and specifies a throat height on the basis of the first position, and a second insulating layer portion which extends rearward from a second position that recedes from the first position while being adjacent to the flat surface in the first insulating layer portion, and covers the thin film coil.

Since the thin film magnetic head having the above-described structural characteristics is mounted on the magnetic recording apparatus according to the invention, the throat height is determined accurately and stably in the thin film magnetic head.

In the method of manufacturing a thin film magnetic head according to the invention, the second step may include: a step of forming a pre-insulating layer so as to cover the first magnetic shield layer portion and the gap layer in the periphery of the first magnetic shield layer portion; and a step of forming the first insulating layer portion by planarizing the pre-insulating layer and the first magnetic shield layer portion by polishing. Preferably, the second insulating layer portion is formed so as to extend rearward from the second position receded from the first position in the third step. In this case, the first insulating layer portion may be formed so as to include an inorganic insulating material in the second step, and the second insulating portion may be formed so as to include a material showing flowability when heated in the third step. Further, the third step may include: a step of forming a base insulating layer portion constructing a part of the second insulating layer portion on the flat surface in the first insulating layer portion; a step of forming the thin film magnetic coil on the base insulating layer portion; and a step of forming the second insulating layer portion so as to include the base insulating layer portion and a covering insulating layer portion by forming the covering insulating layer portion constructing another part of the second insulating layer portion so as to cover the thin film coil and the base insulating layer portion in the periphery of the thin film coil.

In the thin film magnetic head according to the invention, the insulating layer is constructed so as to include the first insulating layer portion which extends rearward from the first position while being adjacent to the gap layer and specifies a throat height on the basis of the first position, and the second insulating layer portion which extends rearward from a second position that recedes from the first position while being adjacent to the flat surface in the first insulating layer portion, and covers the thin film coil, and the magnetic shield layer is constructed so as to include the first magnetic shield layer portion extending rearward from the recording-medium-facing surface to a first position while being adjacent to the gap layer, and the second magnetic shield layer portion extending rearward from the recording-medium-facing surface to at least the back gap while extending partially on the first magnetic shield layer portion. Based on the structural characteristics, the throat height is specified accurately and stably on the basis of the first position by the first insulating layer portion. Therefore, since the throat height is determined with high precision, the recording characteristics can be assured.

In the method of manufacturing a thin film magnetic head according to the invention, the first magnetic shield layer portion is formed so as to extend rearward from the recording-medium-facing surface to a first position while being adjacent to the gap layer, and the first insulating layer portion is formed so as to extend rearward from the first position while being adjacent to the gap layer and to specify the throat height on the basis of the first position. After that, the second insulating layer portion is constructed so as to extend rearward while being adjacent to the flat surface in the first insulating layer portion and to cover the thin film coil, and the second magnetic shield layer portion is formed so as to extend rearward from the recording-medium-facing surface to at least the back gap while partially being on the first magnetic shield layer portion. In such a manner, the magnetic shield layer is formed so as to include the first and second magnetic shield layer portions, and the insulating layer is formed so as to include the first and second insulating layer portions. Based on the characteristics in the manufacturing method, the throat height is specified accurately and stably on the basis of the first position by the first insulating layer portion. Therefore, by determining the throat height with high precision, the recording characteristics can be assured.

On the magnetic recording apparatus according to the invention, the thin film magnetic head having the structural characteristics is mounted. Consequently, the throat height is determined accurately and stably in the thin film magnetic head. Therefore, by mounting the thin film magnetic head in which the throat height is determined with high precision, the recording characteristics can be assured.

Other and further objects, features and advantages of the invention will appear more fully from the following description.

BRIEF DESCRIPTION OF THE DRAWINGS

FIGS. 5A and 5B are cross sections showing a process subsequent to FIGS. 4A and 4B.

DETAILED DESCRIPTION OF THE PRFERRED EMBODIMENTS

Embodiments of the invention will now be described in detail hereinbelow with reference to the drawings.

Figure 1B:
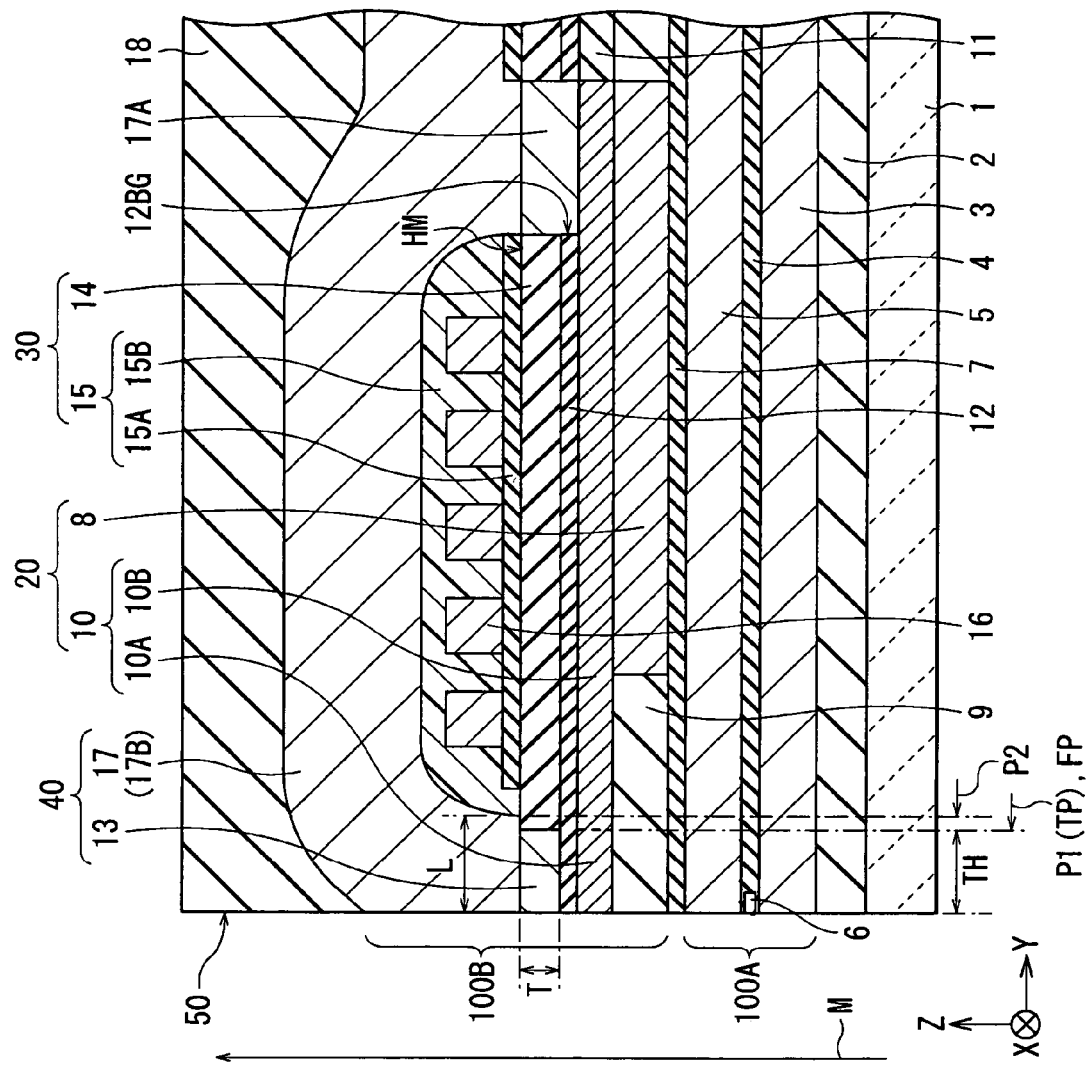
FIGS. 1A and 1B are cross sections showing a sectional configuration of a thin film magnetic head according to an embodiment of the invention.
Figure 1A:
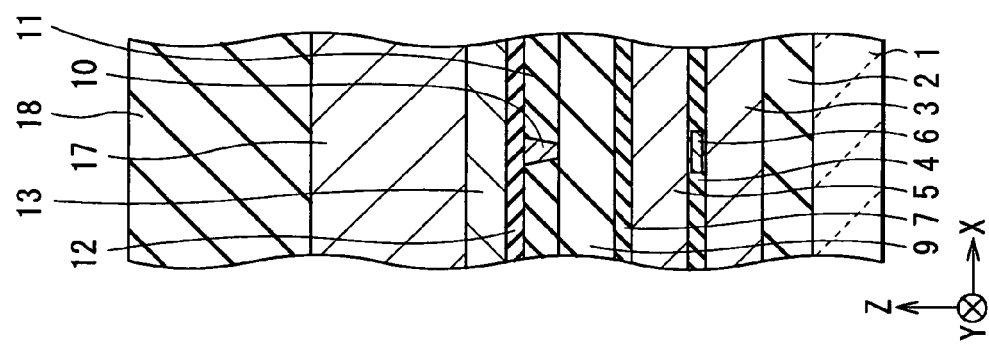
Figure 2:
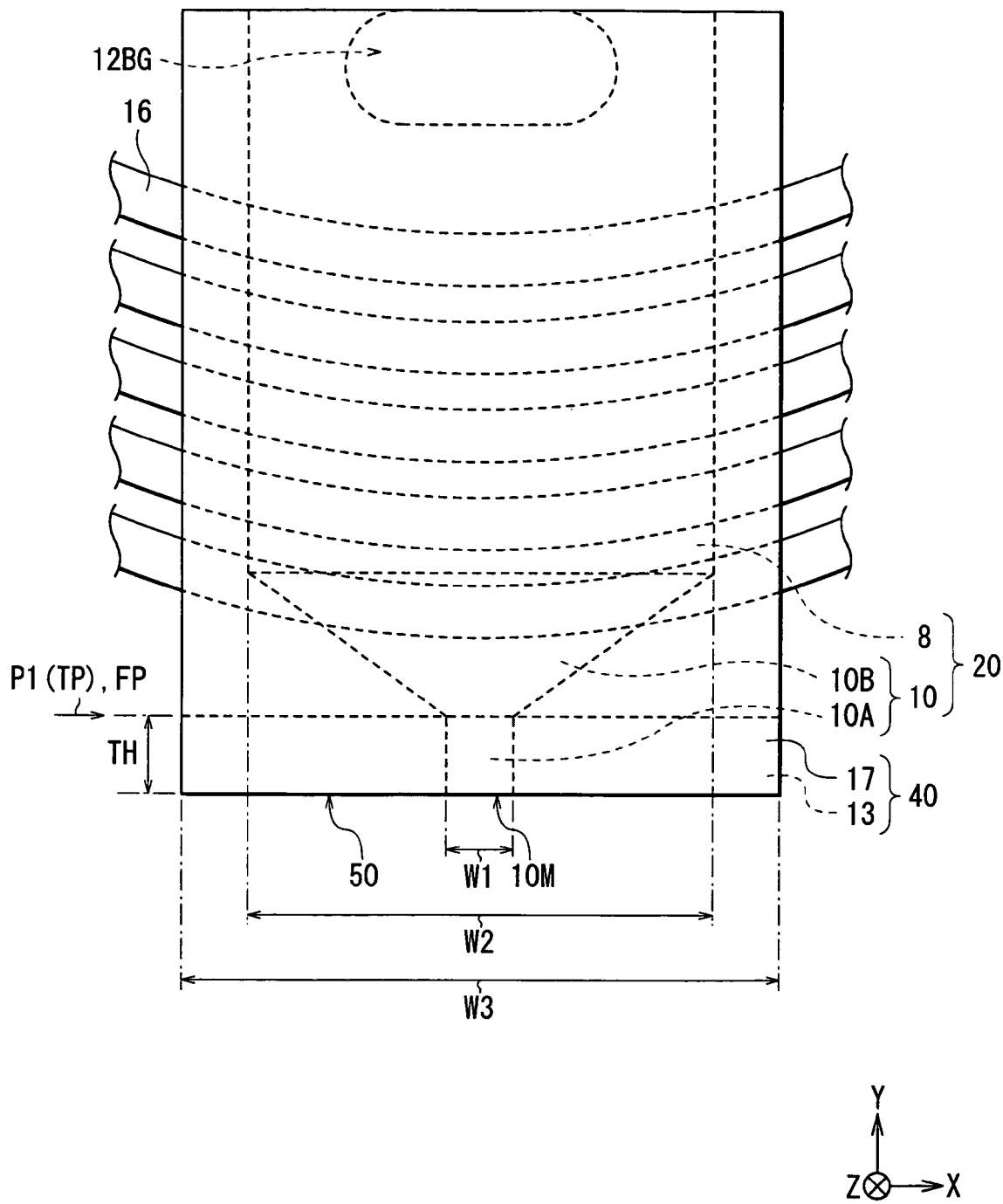
FIG. 2 is a plan view showing the configuration of a main portion of the thin film magnetic head illustrated in FIGS. 1A and 1B.
Figure 3:
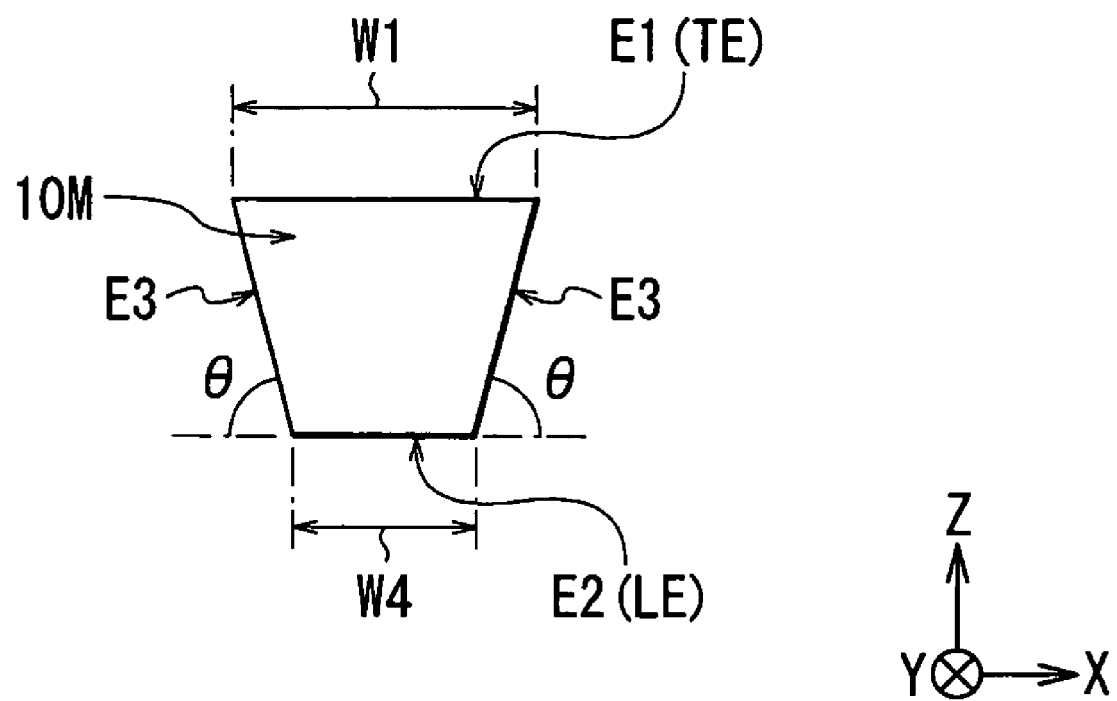
FIG. 3 is a plan view showing the configuration of an exposed surface in the main portion of the thin film magnetic head illustrated in FIGS. 1A and 1B.

First, the configuration of a thin film magnetic head according to an embodiment of the invention will be described with reference to FIGS. 1A and 1B to FIG. 3. FIGS. 1A and 1B to FIG. 3 show the configuration of the thin film magnetic head. FIGS. 1A and 1B show a general sectional configuration. FIG. 2 is a plan view showing the configuration of a main portion (plan-view configuration seen from the Z-axis direction). FIG. 3 is an enlarged plan view (plan-view configuration seen from the Y-axis direction) of the exposed surface in the main portion. FIG. 1A shows a sectional configuration (sectional configuration along an XZ plane) parallel to an air bearing surface, and FIG. 1B shows a sectional configuration (sectional configuration along a YZ plane) perpendicular to the air bearing surface. An upward arrow M shown in FIG. 1B shows the travel direction of a recording medium (not shown) (medium travel direction) relative to the thin film magnetic head.

In the following description, the dimension in the X-axis direction shown in FIGS. 1A and 1B to FIG. 3 will be described as "width", the dimension in the Y-axis direction will be described as "length", and the dimension in the Z-axis direction will be described as "thickness". The side closer to the air bearing surface in the Y-axis direction will be described as "forward" and the side opposite to the front side will be described as "rearward". The expressions will be similarly used in FIGS. 4A and 4B and subsequent drawings.

The thin film magnetic head is mounted on a magnetic recording apparatus such as a hard disk drive to perform a magnetic process on a magnetic recording medium such as a hard disk moving in the medium travel direction M. Concretely, the thin film magnetic head is a composite head capable of executing both of recording and reproducing processes as magnetic processes. As shown in FIGS. 1A and 1B, the thin film magnetic head has a configuration obtained by sequentially stacking, on a substrate 1 made of a ceramic material such as AlTiC ($Al_2O_3 \cdot TiC$), an insulating Layer 2 made of a non-magnetic insulating material such as aluminum oxide ($Al_2O_3$, hereinbelow, simply called "alumina" ), a reproduction head portion 100A for executing a reproducing process by using a magneto-resistive (MR) effect, an insulating layer 7 made of a non-magnetic insulating material such as alumina, a recording head portion 100B of a shield type for executing a recording process of a perpendicular recording method, and an overcoat layer 18 made of a non-magnetic insulating material such as alumina.

The reproduction head portion 100A has, for example, a configuration in which a lower lead shield layer 3, a shield gap film 4, and an upper lead shield layer 5 are stacked in this order. In the shield gap film 4, an MR element 6 as a reproduction element is buried so that one end face is exposed in a recording-medium-facing surface (air bearing surface) 50 which faces a recording medium.

The lower and upper lead shield layers 3 and 5 are used to magnetically isolate the MR element 6 from the periphery and extend rearward from the air bearing surface 50. The lower and upper lead shield layers 3 and 5 are made of, for example, a magnetic material such as a nickel iron alloy (NiFe (for example, Ni:80% by weight and Fe:20% by weight) which will be simply called "permalloy (trademark)" hereinbelow). Each of the layers has a thickness of about 1.0 to 2.0 μm.

The shield gap film 4 is used to electrically isolate the MR element 6 from the periphery and is made of, for example, a non-magnetic insulating material such as alumina.

The MR element 6 is provided to execute a magnetic process (reproducing process) by using, for example, the GMR (Giant Magneto-Resistive) effect, TMR (Tunneling Magneto-Resistive) effect, or the like.

The recording head portion 100B has a configuration, for example, in which a magnetic pole layer 20 whose periphery is buried by insulating layers 9 and 11, a gap layer 12 having an opening for magnetic coupling (back gap 12BG), a thin film coil 16 covered with an insulating layer 30, and a write shield layer 40 (magnetic shield layer) are stacked in this order. FIG. 2 shows only the thin film coil 16, the magnetic pole layer 20, and the write shield layer 40 as a main portion of the recording head portion 100B.

The magnetic pole layer 20 is provided to receive a magnetic flux for recording generated by the thin film coil 16 and to execute a magnetic process (recording process) by emitting the magnetic flux toward a recording medium. More concretely, as a recording process of the perpendicular recording method, the magnetic pole layer 20 generates a magnetic field (perpendicular magnetic field) for magnetizing a recording medium in the direction orthogonal to the surface of the recording medium on the basis of the magnetic flux for recording. The magnetic pole layer 20 is disposed on the leading side of the thin film coil 16, and extends rearward from the air bearing surface 50, concretely, to the position corresponding to the back gap 12BG provided in the gap layer 12. The "leading side" is an inflow side of a recording medium (the bottom side in the medium travel direction M) when a traveling state of the recording medium traveling in the medium travel direction M shown in FIG. 1B is regarded as a flow and is, in this case, a lower side in the thickness direction (Z-axis direction). On the other side, an outflow side (the upper side in the medium travel direction M) is called a "trailing side" and is an upper side in the thickness direction.

The magnetic pole layer 20 has, for example, as shown in FIG. 1B, a stacking structure in which an auxiliary magnetic pole layer 8 whose periphery is buried by the insulating layer 9 and a main magnetic pole layer 10 whose periphery is buried by the insulating layer 11 are stacked in this order, that is, a two-layer structure in which the auxiliary magnetic pole layer 8 is disposed on the leading side and the main magnetic pole layer 10 is disposed on the trailing side.

The auxiliary magnetic pole layer 8 functions as a main magnetic flux storing portion and is adjacent to and magnetically coupled to the main magnetic pole layer 10. The auxiliary magnetic pole layer 8 extends, for example, rearward from a position receded from the air bearing surface 50, concretely, to the position corresponding to the back gap 12BG. The auxiliary magnetic pole layer 8 is made of a magnetic material having high saturation magnetic flux density such as an iron-cobalt-based alloy. Examples of the iron-cobalt-based alloy are an iron cobalt alloy (FeCo) and an iron cobalt nickel alloy (FeCoNi). The above expression "couple" means physical contact and magnetically-conductive couple. The definition of "couple" will be also used in the following description. The auxiliary magnetic pole layer 8 has, for example, as shown in FIG. 2, a rectangular shape having a width W2 in plan view.

The main magnetic layer 10 functions as a main magnetic flux emitting portion and is adjacent to and magnetically coupled to the auxiliary magnetic pole layer 8. The main magnetic pole layer 10 extends, for example, rearward from the air bearing surface 50, concretely, to the position corresponding to the back gap 12BG. Like the auxiliary magnetic pole layer 8, the main magnetic pole layer 10 is made of a magnetic material having high saturation magnetic flux density such as an iron-cobalt-based alloy.

The main magnetic pole layer 10 has, for example as shown in FIG. 2, a battledore shape in plan view. Specifically, the main magnetic pole layer 10 includes, for example, in order from the air bearing surface 50 toward the rear side, a front end portion 10A having a constant width W1 which specifies recording track width of a recording medium, and a rear end portion 10B coupled to the rear side of the front end portion 10A and having a width W2 larger than the width W1 (W2>W1). The position at which the width of the main magnetic pole layer 10 increases from the front end portion 10A (width W1) to the rear end portion 10B (width W2) is a "flare point FP" as one of important factors determining the recording performance of the thin film magnetic head.

The front end portion 10A is a portion for emitting a magnetic flux for recording which is generated by the thin film coil 16 substantially toward a recording medium and, as shown in FIGS. 2 and 3, has an exposed surface 10M exposed in the air bearing surface 50. The exposed surface 10M has, for example, as shown in FIG. 3, has a plan-view shape specified by an upper edge E1 (so-called a trailing edge TE) positioned on the trailing side, a lower edge E2 (so-called a leading edge LE) positioned on the leading side, and two side edges. Concretely, the exposed surface 10M has a shape whose width is gradually narrowed from the trailing side to the leading side, that is, a bilaterally-symmetrical inverted trapezoidal shape using the upper edge E1 having the width W1 as an upper side and using the lower edge E2 having a width W4 smaller than the width W1 (W4<W1) as a bottom side. The trailing edge TE of the exposed surface 10M is a substantial recording position in the magnetic pole layer 20. The angle $\theta$ specifying a shape in plan view of the exposed surface 10M, that is, the angle $\theta$ between the extension direction of the lower edge E2 and the side edge E3 can be set arbitrarily in the range, for example, smaller than 90°.

The rear end portion 10B is a portion for supplying the magnetic flux collected in the auxiliary magnetic pole layer 8 to the front end portion 10A. The width of the rear end portion 10B is, for example, constant (width W2) in the rear portion and gradually narrowed from the width W2 to the width W1 toward the front end portion 10A in the front portion.

The insulating layer 9 electrically isolates the auxiliary magnetic pole layer 8 from the periphery and is made of, for example, a non-magnetic insulating material such as alumina. The insulating layer 11 electrically isolates the main magnetic pole layer 10 from the periphery and is made of, for example, a non-magnetic insulating material such as alumina.

The gap layer 12 constructs a gap for magnetic isolation between the magnetic pole layer 20 and the write shield layer 40. The gap layer 12 is made of, for example, a non-magnetic insulating material such as alumina or a non-magnetic conductive material such as ruthenium (Ru) and has a thickness of about 40.0 nm.

The insulating layer 30 specifies the throat height TH as one of important factors determining the recording characteristics of the thin film magnetic head and electrically isolates the thin film coil 16 from the periphery by covering it. The insulating layer 30 is disposed over the gap layer 12 so as not to close the back gap 12BG. The insulating layer 30 has, as shown in FIG. 1B, a stacking structure in which an auxiliary insulating layer 14 (first insulating layer portion) substantially specifying the throat height TH and a main insulating layer 15 (second insulating layer portion) substantially covering the thin film coil 16 are stacked in this order. That is, the insulating layer 30 has the two-layer structure where the auxiliary insulating layer 14 is disposed on the leading side and the main insulating layer 15 is disposed on the trailing side.

As shown in FIG. 1B, the auxiliary insulating layer 14 extends rearward from a position P1 (first position) receding from the air bearing surface 50 so as not to close the back gap 12BG while being adjacent to the gap layer 12, and is adjacent to a TH specifying layer 13 which will be described later in the write shield layer 40 at the position P1. In particular, the auxiliary insulating layer 14 constructs a flat surface HM in cooperation with the TH specifying layer 13, that is, the auxiliary insulating layer 14 and the TH specifying layer 13 are planarized. The "position P1" is the front position (position closest to the air bearing surface 50) in the insulating layer 30, that is, "throat height zero position TP" to specify the throat height TH. The throat height TH is a distance between the air bearing surface 50 and the throat height zero position TP. The auxiliary insulating layer 14 is made of, for example, an inorganic insulating material, concretely, a non-magnetic insulating material such as alumina. FIGS. 1A and 1B and FIG. 2 show the case where the throat height zero position TP coincides with the flare point FP as an example.

As shown in FIG. 1B, the main insulating layer 15 extends rearward from the position P2 (second position) receding from the position P1 (throat height zero position TP) so as not to cover the back gap 12BG while being adjacent to the flat surface HM in the auxiliary insulating layer 14. That is, the main insulating layer 15 is in a position receding from the auxiliary insulating layer 14. The main insulating layer 15 includes, for example as shown in FIG. 1B, a main insulating layer portion 15A (base insulating layer portion) disposed as a base of the thin film coil 16 on the flat surface HM in the auxiliary insulating layer 14, and a main insulating layer portion 15B (cover insulating layer portion) disposed to cover the thin film coil 16 and the main insulating layer portion 15A in the periphery of the thin film coil 16. The main insulating layer portion 15A is made of, for example, an inorganic insulating material, concretely, a non-magnetic insulating material such as alumina. The main insulating layer portion 15B is made of, for example, a material which displays flowability when heated, concretely, a non-magnetic insulating material such as photoresist or spin on glass (SOG). An edge portion of the main insulating layer portion 15B has a rounded slope downward to the edge.

The thin film coil 16 is to generate a magnetic flux for recording and is made of, for example, a high conductive material such as copper (Cu). The thin film coil 16 has, for example as shown in FIG. 1B and FIG. 2, a winding structure (spiral structure) which winds around the back gap 12BG as a center. In FIG. 1B and FIG. 2, only a part of a plurality of turns constructing the thin film coil 16 is shown.

The write shield layer 40 is provided to receive a spread component of the magnetic flux for recording emitted from the magnetic pole layer 20 and to suppress the spread of the magnetic flux. The write shield layer 40 is disposed on the trailing side of the thin film coil 16, extends rearward from the air bearing surface 50, is isolated from the magnetic pole layer 20 by the gap layer 12 on the side close to the air bearing surface 50, and is coupled to the magnetic pole layer 20 via the back gap 12BG on the far side. Particularly, the write shield layer 40 includes, for example, the TH specifying layer 13 (first magnetic shield layer portion) and a yoke layer 17 (second magnetic shield layer portion) as members different from each other.

The TH specifying layer 13 functions as a main magnetic flux receiving port and, as shown in FIG. 1B, extents rearward from the air bearing surface 50 to the position P1 on the rear side while being adjacent to the gap layer 12. In the position P1, the TH specifying layer 13 is adjacent to the auxiliary insulating layer 14 in the insulating layer 30. The TH specifying layer 13 is made of, for example, a magnetic material having high saturation magnetic flux density such as permalloy or iron-cobalt-based alloy and has, for example as shown in FIG. 2, a rectangular shape in plan view having a width W3 larger than the width W2 of the magnetic pole layer 20 (W3>W2). As described above, since the TH specifying layer 13 is adjacent to the auxiliary insulating layer 14 at the position P1, the TH specifying layer 13 has the role of specifying the front position of the insulating layer 30 (throat height zero position TP), thereby substantially specifying the throat height TH.

The yoke layer 17 functions as a path of the magnetic flux received from the TH specifying layer 13 and, as shown in FIG. 1B, extends rearward from the air bearing surface 50 while being on the TH specifying layer 13 to at least the back gap 12BG via the insulating layer 30. That is, the yoke layer 17 is magnetically coupled onto the TH specifying layer 13 in the forward portion. The yoke layer 17 is adjacent to and magnetically coupled to the magnetic pole layer 20 via the back gap 12BG in the rearward portion. In this case, for example, the yoke layer 17 extends to a position rearward of the back gap 12BG while being magnetically coupled to the magnetic pole layer 20 via the back gap 12BG. The yoke layer 17 is made of, for example, a magnetic material having high saturation magnetic flux density such as permalloy or iron-cobalt-based alloy in a manner similar to the TH specifying layer 13 and has a rectangular shape in plan view having the width W3 as shown in FIG. 2. For example, as shown in FIG. 1B, the yoke layer 17 includes a yoke layer portion 17A disposed in the back gap 12BG at the same level as the TH specifying layer 13 and magnetically coupled to the magnetic pole layer 20, and a yoke layer portion 17B extending from the air bearing surface 50 to a position corresponding to the back gap 12BG and magnetically coupled to the magnetic pole layer 20 via the yoke layer portion 17A.

The operation of the thin film magnetic head will now be described with reference to FIGS. 1A and 1B to FIG. 3.

In the thin film magnetic head, at the time of recording information, when a current flows into the thin film coil 16 of the recording head portion 100B from a not-shown external circuit, a magnetic flux for recording is generated by the thin film coil 16. The magnetic flux generated at this time is received by the magnetic pole layer 20 (the auxiliary magnetic pole layer 8 and the main magnetic pole layer 10) and flows to the front end portion 10A of the main magnetic pole layer 10 in the magnetic pole layer 20. Since the magnetic flux flowing in the magnetic pole layer 20 is converged at the flare point FP as the width of the magnetic pole layer 20 decreases, the magnetic flux is concentrated near the portion of the trailing edge TE in the exposed surface 10M of the front end portion 10A. When the magnetic flux concentrated near the portion of the trailing edge TE is emitted to the outside, a recording magnetic field (perpendicular magnetic field) is generated in the direction orthogonal to the surface of a recording medium (the perpendicular direction) and the recording medium is magnetized in the perpendicular direction by the perpendicular recording magnetic field, thereby magnetically recording information onto the recording medium. At the time of recording information, a spread component of the magnetic flux emitted from the front end portion 10A is received by the write shield layer 40, so that spread of the magnetic flux is prevented. The magnetic flux received by the write shield layer 40 is returned to the magnetic pole layer 20 via the back gap 12BG.

On the other hand, at the time of reproducing information, when sense current flows into the MR element 6 in the reproduction head portion 100A, the resistance value of the MR element 6 changes according to a signal magnetic field for reproduction based on the recording medium. Since the resistance change of the MR element 6 is detected as a change in the sense current, the information recorded on the recording medium is magnetically reproduced.

A method of manufacturing the thin film magnetic head according to the embodiment of the invention will now be described with reference to FIGS. 1A and 1B to FIGS. 8A and 8B. FIGS. 4A and 4B to FIGS. 8A and 8B are diagrams for explaining processes of manufacturing the thin film magnetic head and show sectional configurations corresponding to FIGS. 1A and 1B.

In the following, first, an outline of processes of manufacturing a whole thin film magnetic head will be described with reference to FIGS. 1A and 1B. After that, processes of forming a main portion (the insulating layer 30 and the write shield layer 40) of the thin film magnetic head applied to the method of the thin film magnetic head according to the embodiment of the invention will be described more specifically with reference to FIGS. 1A and 1B to FIG. 8. Since the materials, dimensions, structural features, and the like of the series of the components of the thin film magnetic head have been already described in detail, the description will not be repeated.

The thin film magnetic head is manufactured by sequentially forming and stacking the components by mainly using an existing thin film process including a film forming technique typified by a plating process and sputtering, a patterning technique typified by as a photolithography process, and an etching technique typified by dry etching and wet etching. Specifically, first, as shown in FIGS. 1A and 1B, the insulating layer 2 is formed on the substrate 1 and, after that, the lower lead shield layer 3, the shield gap film 4 in which the MR element 6 is buried, and the upper lead shield layer 5 are stacked on the insulating layer 2 in accordance with this order, thereby forming the reproduction head portion 100A. Subsequently, the insulating layer 7 is formed on the reproduction head portion 100A. On the insulating layer 7, by sequentially stacking the magnetic pole layer 20 (the auxiliary magnetic pole layer 8 and the main magnetic pole layer 10) whose periphery is buried by the insulating layers 9 and 11, the gap layer 12 in which the back gap 12BG is provided, the insulating layer 30 (the auxiliary insulating layer 14 and the main insulating layer 15) which covers the thin film coil 16, and the write shield layer 40 (the TH specifying layer 13 and the yoke layer 17), the recording head portion 100B is formed. Finally, the overcoat layer 18 is formed on the recording head portion 100B and, after that, the air bearing surface 50 is formed by using mechanism processing and polishing process, thereby completing the thin film magnetic head.

Figure 4B:
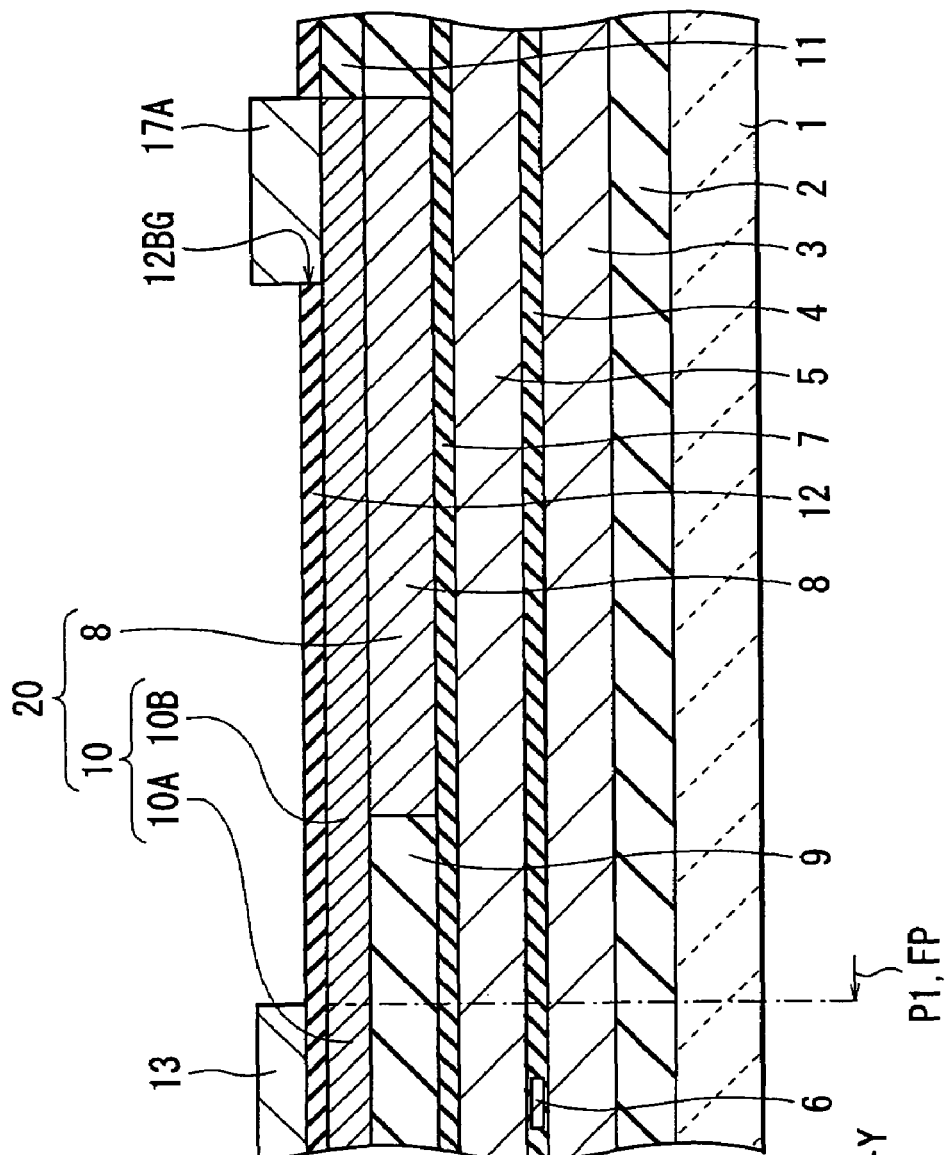
FIGS. 4A and 4B are cross sections for explaining a process in a method of manufacturing the thin film magnetic head according to the embodiment of the invention.
Figure 4A:
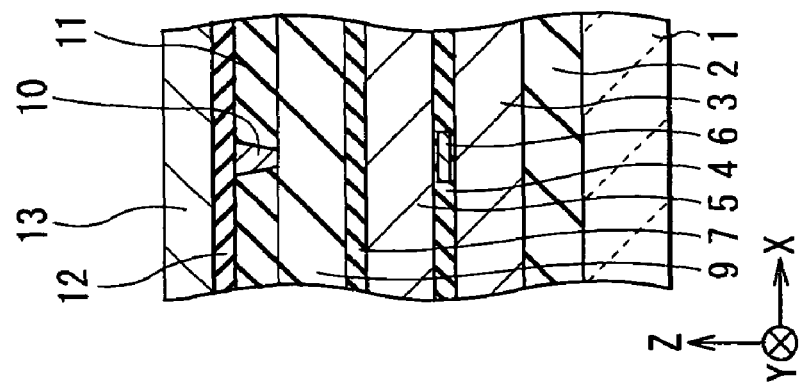

At the time of forming a main portion of the thin film magnetic head, the gap layer 12 in which the back gap 12BG is provided is formed. After that, first, as shown in FIGS. 4A and 4B, a plating film is selectively grown on gap layer 12 by using, for example, a plating process, thereby patterning the TH specifying layer 13 as a part of the write shield layer 40 (refer to FIGS. 8A and 8B). The TH specifying layer 13 is formed so as to extend from the position in which the air bearing surface 50 is finally formed (refer to FIG. 1B) to the rearward position P1 while being adjacent to the gap layer 12.

An example of the detail procedure of forming the TH specifying layer 13 is as follows. First, a seed layer (not shown) as an electrode layer is formed on the gap layer 12 by using sputtering. As a forming material of the seed layer, for example, a magnetic material similar to that of the TH specifying layer 13 is used. Subsequently, photoresist is applied on the seed layer, thereby forming a photoresist film. After that, the photoresist film is patterned by using the photolithography process, thereby forming a photoresist pattern (not shown) for forming the TH specifying layer 13. In the photoresist pattern, an opening having an opening pattern corresponding to the shape in plan view of TH specifying layer 13 is provided. As a forming material of the photoresist pattern, for example, a photoresist of a positive-type or a negative-type may be used. Subsequently, the seed layer formed in the preceding process is used as an electrode layer and a plating film is grown in the opening provided in the photoresist pattern, thereby forming the TH specifying layer 13. Finally, the photoresist pattern is removed and, after that, the used seed layer is selectively etched with the TH specifying layer 13 as a mask by using ion milling, thereby removing an unnecessary portion in the seed layer. As a result, the TH specifying layer 13 is patterned on the gap layer 12.

At the time of forming the TH specifying layer 13, for example, a plating film is also selectively grown in the back gap 12BG in the process of forming the TH specifying layer 13, thereby also forming the yoke layer portion 17A as a part of the yoke layer 17 (reference to FIGS. 8A and 8B) which constructs another part of the write shield layer 40 as shown in FIG. 4B.

After forming the TH specifying layer 13 and the yoke layer portion 17A, a film made of an inorganic insulating material such as alumina is formed, for example, by using sputtering so as to cover the TH specifying layer 13, the yoke layer portion 17A, and the gap layer 12 in the periphery of the yoke layer portion 17A, thereby forming a pre-insulating layer 14Z as shown in FIGS. 5A and 5B. The pre-insulating layer 14Z is a preparation layer which becomes the auxiliary insulating layer 14 (refer to FIGS. 6A and 6B) by being polished in a post process. The pre-insulating layer 14Z is formed so that, for example, the lowest level of the surface is higher than the highest level of both of the surfaces of the TH specifying layer 13 and yoke layer portion 17A.

Figure 6B:
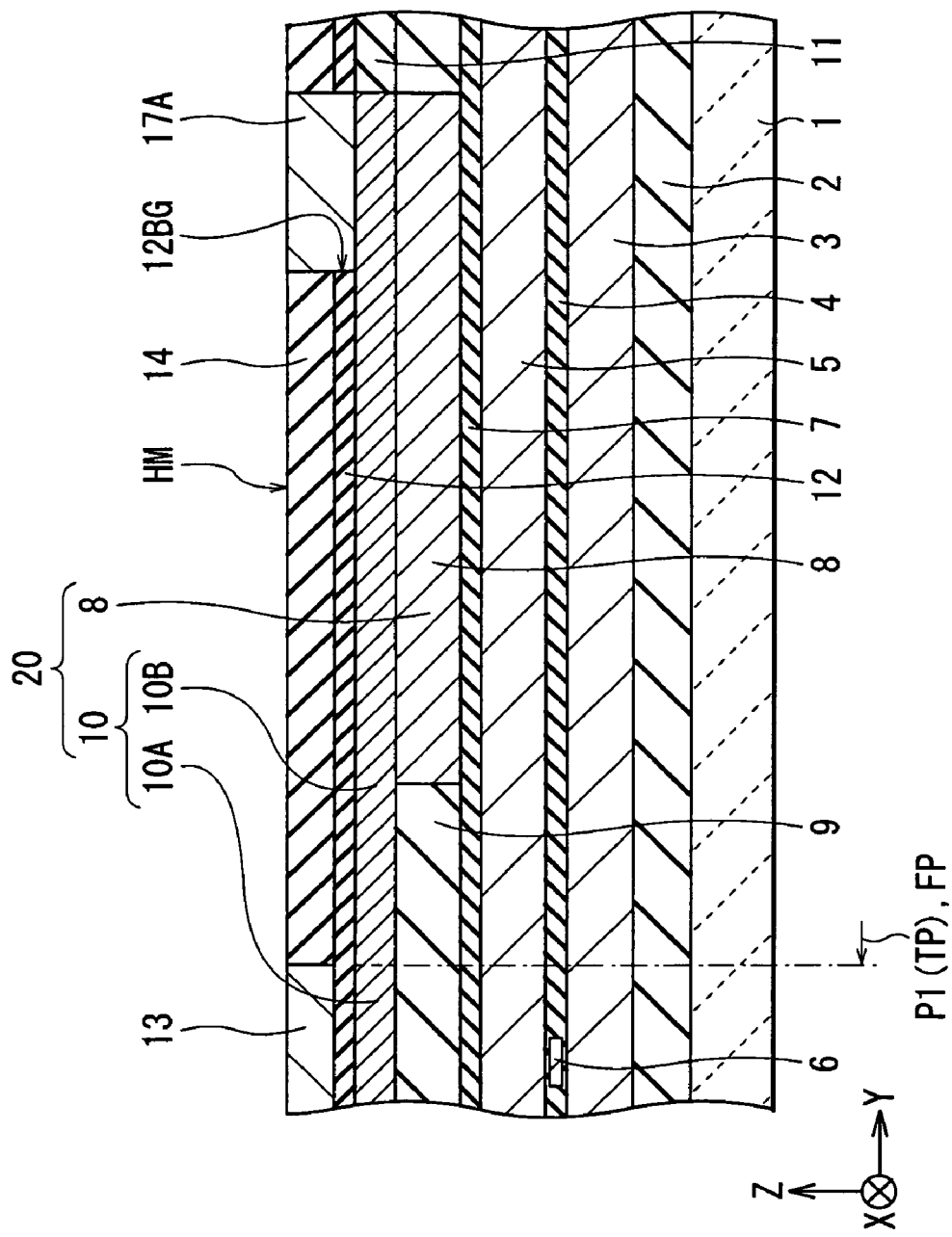
FIGS. 6A and 6B are cross sections showing a process subsequent to FIGS. 5A and 5B.
Figure 6A:
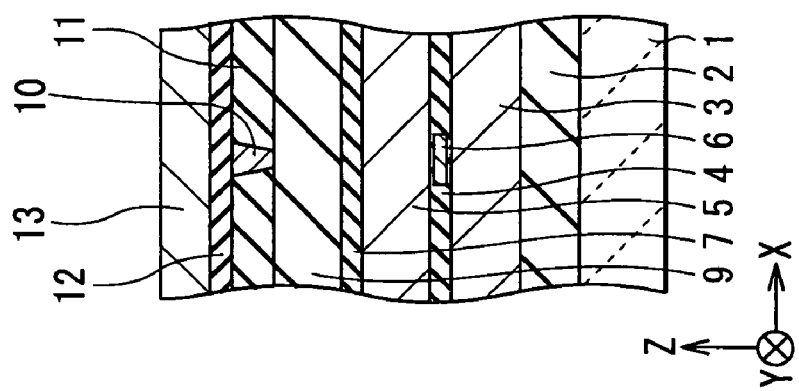
Figure 7B:
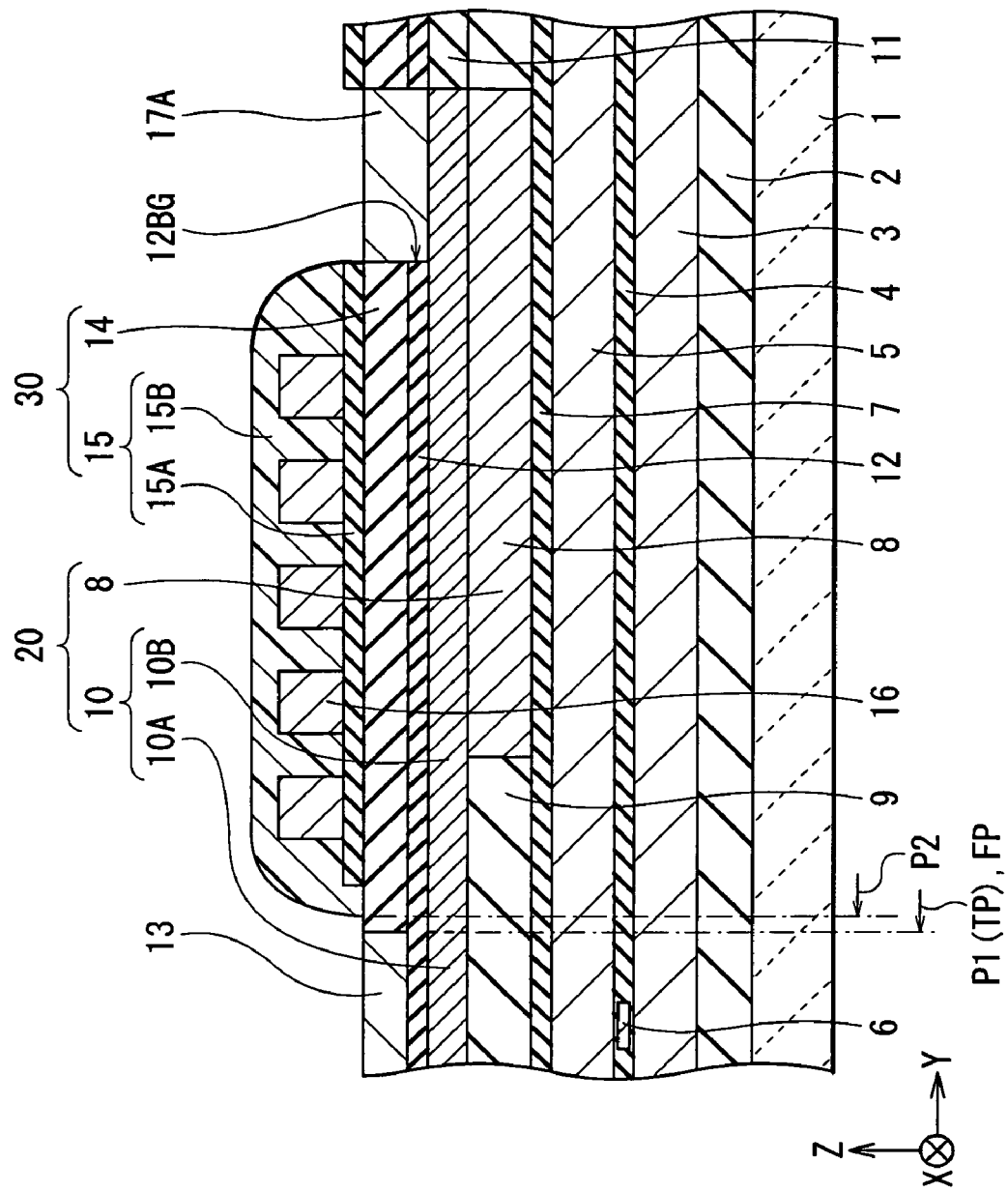
FIGS. 7A and 7B are cross sections showing a process subsequent to FIGS. 6A and 6B.
Figure 7A:
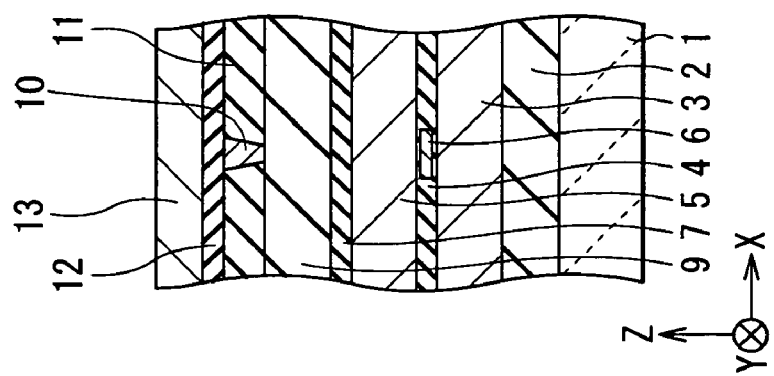

Subsequently, for example, by using CMP (Chemical Mechanical Polishing), the pre-insulating layer 14Z is polished until the TH specifying layer 13 is exposed, that is, the TH specifying layer 13 and the yoke layer portion 17A are polished together with the pre-insulating layer 14Z and planarized, thereby forming the auxiliary insulating layer 14 constructing a part of the insulating layer 30 as shown in FIGS. 6A and 6B (refer to FIGS. 7A and 7B). At the time of forming the auxiliary insulating layer 14, the TH specifying layer 13 and the yoke layer portion 17A are polished to be planarized together with the pre-insulating layer 14Z. Consequently, the flat surface HM is constructed by the TH specifying layer 13 and the yoke layer portion 17A together with the auxiliary insulating layer 14, and the auxiliary insulating layer 14 is formed so as to extend rearward from the position P1 while being adjacent to the gap layer 12. Therefore, in the case of forming the air bearing surface 50 last (reference to FIG. 1B), the throat height TH is specified on the basis of the position P1 (throat height zero position TP).

Subsequently, as shown in FIG. 7, on the auxiliary insulating layer 14, the main insulating layer 15 constructing another part of the insulating layer 30 is formed so as to extend rearward while being adjacent to the flat surface HM in the auxiliary insulating layer 14 and cover the thin film coil 16. The main insulating layer 15 is formed so as to extend rearward from the position P2 receded more than the position P1. As a result, the insulating layer 30 is formed so as to include the auxiliary insulating layer 14 and the main insulating layer 15.

An example of the detail procedure of forming the main insulating layer 15 is as follows. First, a film of an inorganic insulating material such as alumina is formed on the flat surface HM in the auxiliary insulating layer 14 by using, for example, sputtering, thereby patterning the main insulating layer portion 15A constructing a part of the main insulating layer 15. Subsequently, a plating film is selectively grown on the main insulating layer portion 15A, for example, by using the plating process, thereby patterning the thin film coil 16. Finally, the main insulating layer portion 15B constructing another part of the main insulating layer 15 is patterned so that the thin film coil 16 and the main insulating layer portion 15A in the periphery of the thin film coil 16 are covered. At the time of forming the main insulating layer portion 15B, for example, by applying a material displaying flowability when heated such as photoresist, a photoresist film is formed so as to cover the thin film coil 16 and the main insulating layer portion 15A in the periphery of the thin film coil 16. Subsequently, the photoresist film is patterned by using the photolithography process and, after that, the photoresist film is baked. As a result, on the flat surface HM in the auxiliary insulating layer 14, the main insulating layer 15 is formed so as to include the main insulating layer portions 15A and 15B.

Figure 8B:
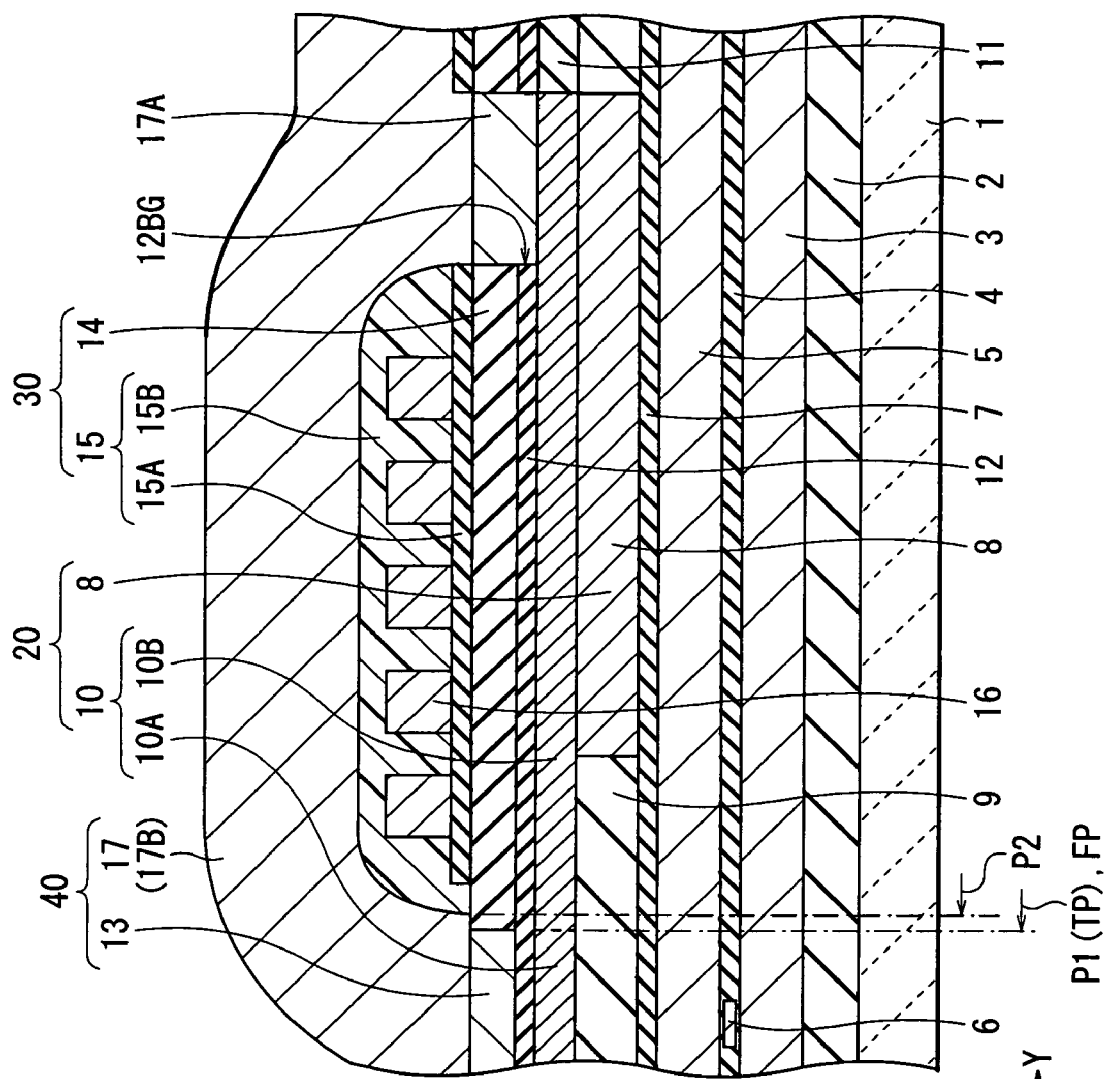
FIGS. 8A and 8B are cross sections showing a process subsequent to FIGS. 7A and 7B.
Figure 8A:
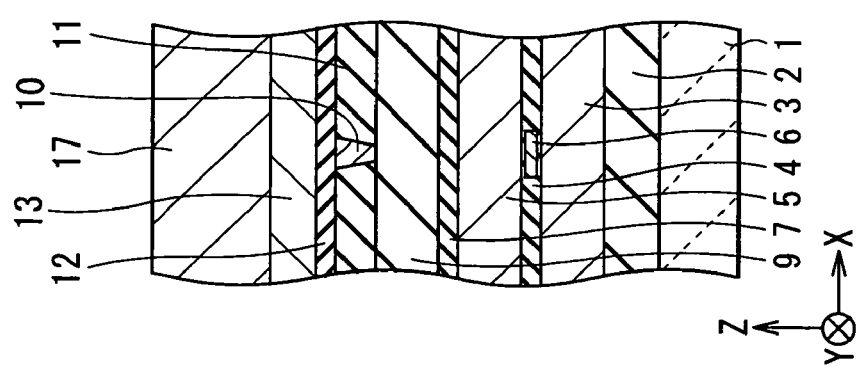

The insulating layer 30 (the auxiliary insulating layer 14 and the main insulating layer 15) is formed and, after that, a plating film is selectively grown, for example, by using a plating process as shown in FIGS. 8A and 8B to form the yoke layer portion 17B as another part of the yoke layer 17 constructing another part of the write shield layer 40 so as to extend rearward from the position in which the air bearing surface 50 is formed in a post process (FIGS. 1A and 1B) via the back gap 12BG while being on the TH specifying layer 13. In such a manner, the yoke layer 17 is formed so as to include the yoke layer portions 17A and 17B. Accordingly, the write shield layer 40 is formed so as to include the TH specifying layer 13 and the yoke layer 17, and it completes the main part of the thin film magnetic head (the insulating layer 30 and the write shield layer 40).

To simplify the description, it is assumed that the write shield layer 40 (the TH specifying layer 13 and the yoke layer 17) becomes complete at the time point shown in FIGS. 8A and 8B. Strictly, as shown in FIGS. 1A and 1B, at the time of forming the air bearing surface 50 in a post process, the write shield layer 40 becomes substantially complete.

In the method of manufacturing the thin film magnetic head of the embodiment, the TH specifying layer 13 is formed so as to extend to the position P1 while being adjacent to the gap layer 12. Similarly, the auxiliary insulating layer 14 is formed so as to extend from the position P1 while being adjacent to the gap layer 12 and specify the throat height TH on the basis of the position P1. After that, the main insulating layer 15 is formed so as to cover the thin film coil 16 on the auxiliary insulating layer 14, and the yoke layer 17 is formed so as to extend while being onto the TH specifying layer 13. In such a manner, the insulating layer 30 is formed so as to include the auxiliary insulating layer 14 and the main insulating layer 15, and the write shield layer 40 is formed so as to include the TH specifying layer 13 and the yoke layer 17. Therefore, for the following reason, by determining the throat height TH with high precision, the recording characteristics can be assured.

Figure 9A:
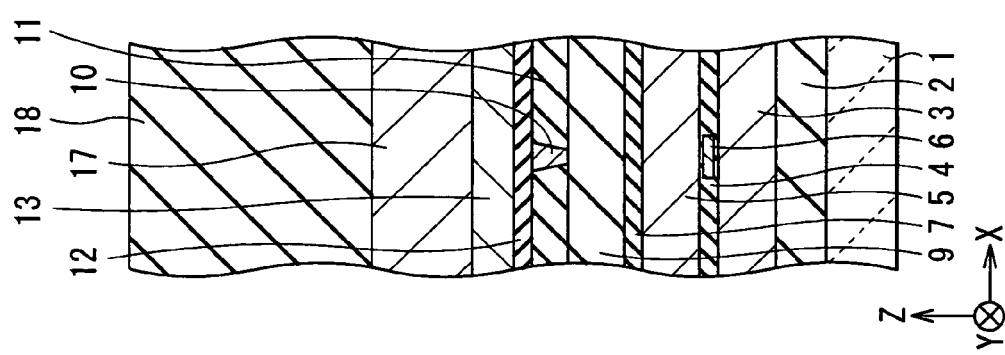
FIGS. 9A and 9B are cross sections showing a sectional configuration of a thin film magnetic head manufactured by a method of manufacturing a thin film magnetic head as a comparative example of the method of manufacturing a thin film magnetic head according to the embodiment of the invention.
Figure 9B:
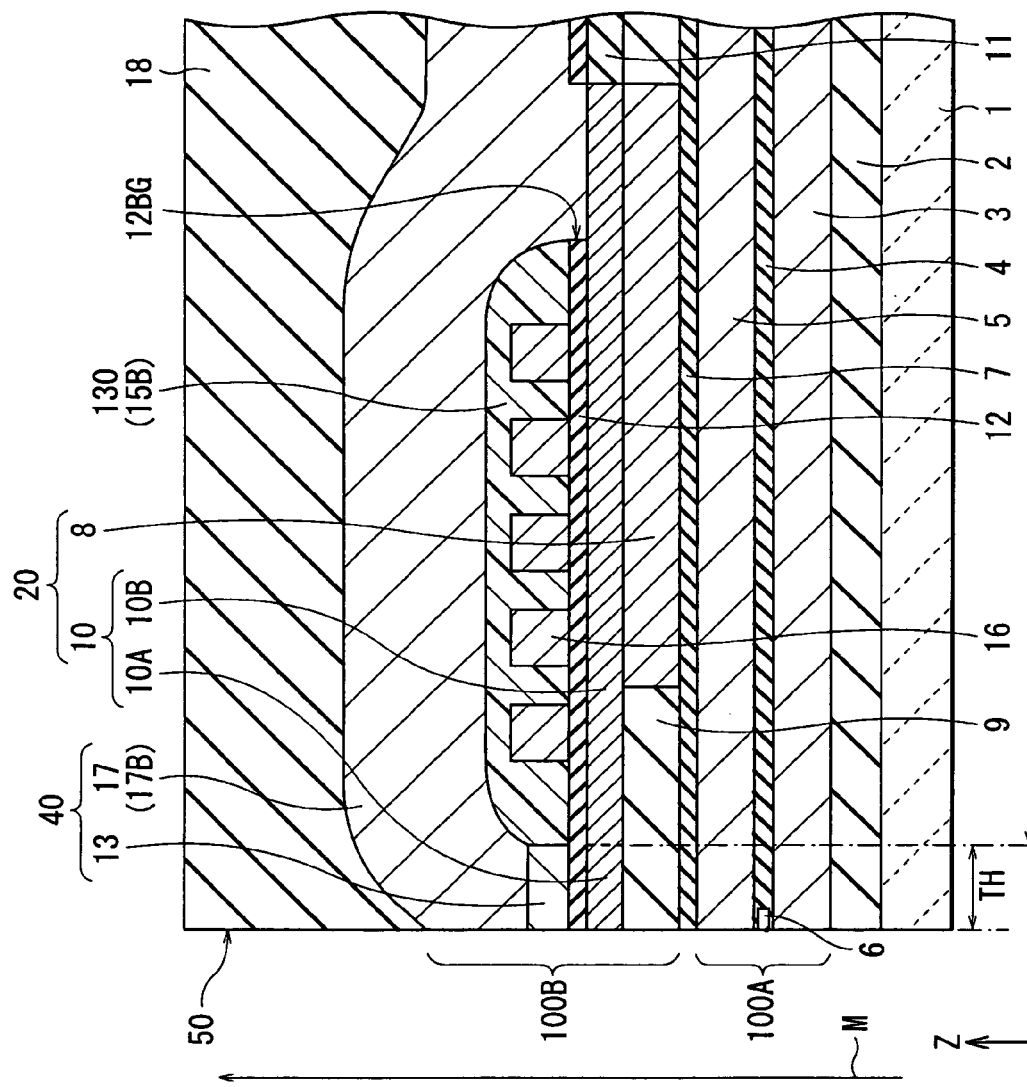

FIGS. 9A and 9B show a sectional configuration of a thin film magnetic head manufactured by a method of manufacturing a thin film magnetic head as a comparative example of the method of manufacturing the thin film magnetic head according to the embodiment of the present invention. The sectional configuration corresponds to FIGS. 1A and 1B. The method of manufacturing the thin film magnetic head as the comparative example employs processes similar to those of the method of manufacturing the thin film magnetic head according to the embodiment of the invention in which the insulating layer 30 is formed so as to include the auxiliary insulating layer 14 and the main insulating layer 15 (the main insulating layer portions 15A and 15B) except that an insulating layer 130 is formed so as to include only the main insulating layer portion 15B without including the auxiliary insulating layer 15A. More specifically, in the thin film magnetic head as the comparative example shown in FIGS. 9A and 9B, the thin film coil 16 is disposed on the gap layer 12, and the insulating layer 130 (the main insulating layer portion 15B) is provided so as to cover the thin film coil 16 and the gap layer 12 in the periphery of the thin film coil 16. Specifically, in the thin film magnetic head of the comparative example, the insulating layer 130 is adjacent to the TH specifying layer 13 at the position P1, so that the position P2 of the front end of the insulating layer 130 coincides with the position P1, and the throat height zero position TP is specified on the basis of the position P2, thereby specifying the throat height TH.

Figure 10:
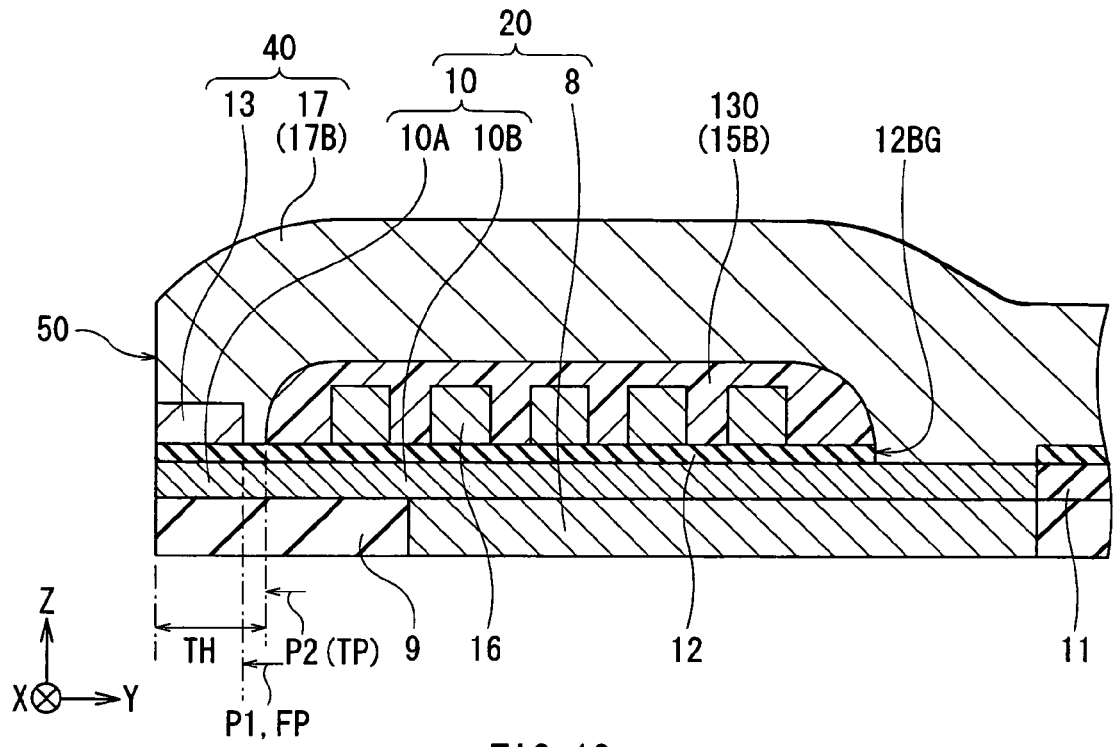
FIG. 10 is a cross section for explaining a problem of the method of manufacturing a thin magnetic head of the comparative example.
Figure 11:
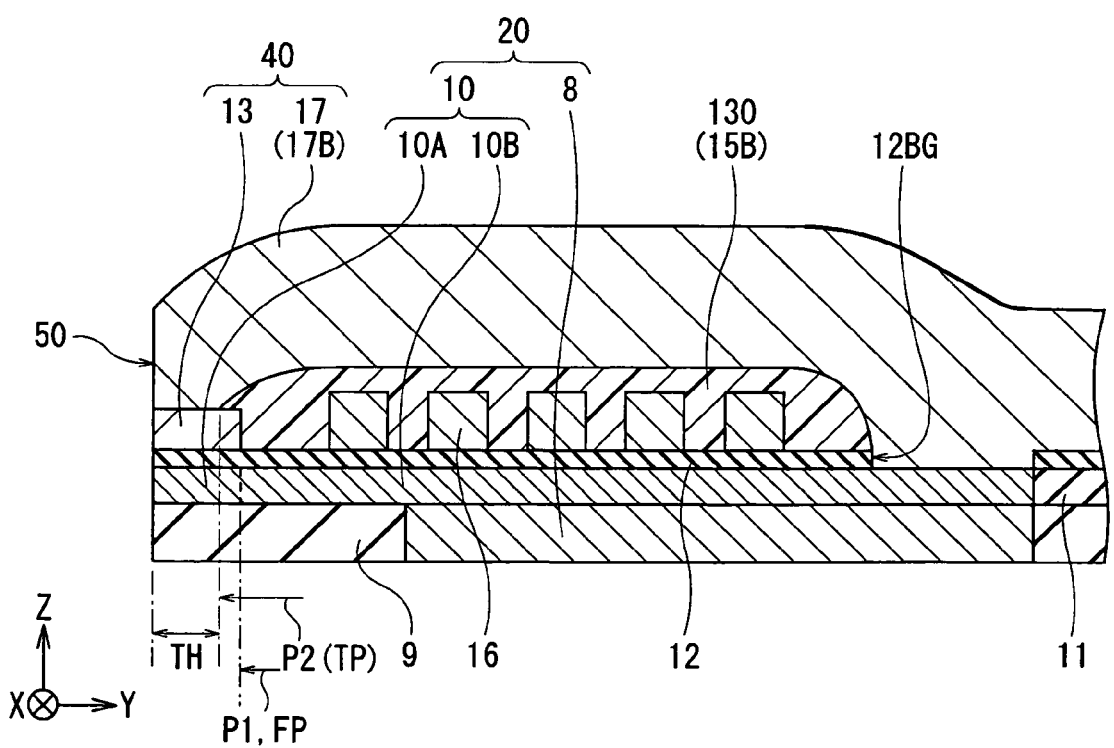
FIG. 11 is a cross section for explaining another problem of the method of manufacturing a thin film magnetic head of the comparative example.

In the method of manufacturing the thin film magnetic head of the comparative example (refer to FIGS. 9A and 9B), the throat height TH is specified on the basis of the position P2 by the insulating layer 130 (the main insulating layer portion 15B) so that the throat height TH tends to deviate from a target value. Specifically, for example, the main insulating layer portion 15B constructing the insulating layer 130 is made of a material which displays flowability when heated such as photoresist. When heated at the time of baking, the photoresist flows. The shape of the main insulating layer portion 15B is determined on the basis of a fixing state after the flow of the photoresist. In this case, if the position P2 of the front end of the insulating layer 130 does not coincide with the position P1, the throat height zero position TP deviates from the target position so that the throat height TH is also deviated from the target value. Concretely, for example, if the photoresist does not flow sufficiently when it is heated at the time of baking, as shown in FIG. 10, the insulating layer 130 is not adjacent to the TH specifying layer 13. That is, the position P2 of the front end of the insulating layer 130 is shifted rearward from the position P1. As a result, the throat height zero position TP specified on the basis of the position P2 recedes more than a target position (position P1), so that the throat height TH becomes longer than the target value. On the other hand, for example, when the photoresist flows excessively when it is heated at the time of baking, as shown in FIG. 11, the insulating layer 130 extends onto the TH specifying layer 13, that is, the position P2 of the front end of the insulating layer 130 shifts to the front of the position P1. Accordingly, the throat height zero position TP specified on the basis of the position P2 shifts to the front of the target position (position P1), so that the throat height TH becomes shorter than the target value. In the method of manufacturing the thin film magnetic head of the comparative example, since the throat height TH is not specified accurately and stably on the basis of the position P2 by the insulating layer 130, it is difficult to assure the recording characteristics by determining the throat height TH with high precision.

In contrast, in the method of manufacturing the thin film magnetic head according to the embodiment (refer to FIGS. 1A and 1B), the throat height TH is specified on the basis of the position P1 by the auxiliary insulating layer 14 in the insulating layer 30 so that the throat height TH coincides with the target value. Specifically, for example, the auxiliary insulating layer 14 is made of a material which does not display flowability when heated such as alumina, and the shape of the auxiliary insulating layer 14 is determined on the basis of the fixing state after polish of the pre-insulating layer 14Z. In this case, as long as the pre-insulating layer 14Z is adjacent to the TH specifying layer 13 at the position P1, the throat height zero position TP is unconditionally determined on the basis of the position P1 by the auxiliary insulating layer 14 and, accordingly, the throat height TH is also unconditionally specified. Therefore, the throat height TH coincides with the target value. Since the main insulating layer 15 is made of a material which displays flowability when heated such as photoresist as described above, the position P2 of the front end of the main insulating layer 15 tends to fluctuate according to the flow state of the photoresist. However, as long as the position P2 of the front end of the main insulating layer 15 is on the rear side of the position P2, the throat height zero position TP is specified on the basis of the position P1. Consequently, the position P2 of the front end of the main insulating layer 15 is not related to the throat height zero position TP. Concretely, for example, by specifying the main insulating layer 15 behind the position P1 so that its position P2 does not shift to the front of the position P1 even in the case where the position P2 fluctuates in consideration of fluctuations (for example, ±0.15 μm with respect to the target position) of the position P2 of the front end of the main insulating layer 15, the throat height zero position TP is always determined on the basis of the position P1. Therefore, in the method of manufacturing the thin film magnetic head according the embodiment, the throat height TH is determined accurately and stably on the basis of the position P1 by the auxiliary insulating layer 14. Thus, the throat height TH is determined with high precision and the recording characteristics can be assured. In this case, particularly, even if the throat height TH is considerably shortened to about 0.3 μm or less in consideration of the today's technical background, the throat height TH can be determined with high precision.

Since the insulating layer 30 covering the thin film coil 16 is formed so as to include the auxiliary insulating layer 14 and the main insulating layer 15, the embodiment has advantages also from the following viewpoints. In the method of manufacturing the thin film magnetic head of the comparative example (refer to FIGS. 9A and 9B) where the thin film coil 16 is formed on the gap layer 12, the thin film coil 16 is formed by using the plating process. After that, when etching of ion milling acts on the gap layer 12 as a very thin base (thickness of about 40.0 nm) at the time of removing the unnecessary portion of the seed layer by using ion milling, the gap layer 12 is removed together with the seed layer. As a result, a pinhole tends to be opened in the position where the gap layer 12 has been removed. When a pinhole is open in the gap layer 12, the thin film coil 16 is unintentionally conductive to the magnetic pole layer 20 via the pinhole so that a so-called short circuit happens to occur. In contrast, the method of manufacturing the thin film magnetic head of the embodiment where the thin film coil 16 is formed on the auxiliary insulating layer 14 and the main insulating layer portion 15A (refer to FIGS. 1A and 1B), the auxiliary insulating layer 14 and the main insulating layer portion 15A interpose between the gap layer 12 and thin film coil 16. At the time of removing an unnecessary portion of the seed layer by using ion milling, the etching of ion milling hardly acts on the gap layer 12. Therefore, in the embodiment, formation of a pinhole in the gap layer 12 due to the etching action of ion milling is suppressed, so that occurrence of a short circuit between the thin film coil 16 and the magnetic pole layer 20 can be prevented.

In the embodiment, the thin film coil 16 is formed on the flat surface HM of the auxiliary insulating layer 14 via the main insulating layer portion 15A. Consequently, at the time of forming the thin film coil 16 by using the plating process, a photoresist pattern for forming the thin film coil 16 is formed with high precision for the following reason. At the time of exposing the photoresist film by using the photolithography process in order to form the photoresist pattern, in the case where the base on which the thin film coil 16 is formed has roughness, light for exposure tends to reflect in oblique directions in accordance with projections and depressions in the base so that an exposed area in the photoresist film easily enlarges due to the light reflecting in the oblique directions. However, in the case where the base on which the thin film coil 16 is formed is flat, the light for exposure does not easily reflect in the oblique directions by the base, so that the exposed area in the photoresist film is prevented from enlarging. Therefore, the thin film coil 16 can be formed by using the photoresist pattern formed with high precision, so that the thin film coil 16 can be formed with high precision also in the case where a wire width or a winding pitch is extremely small.

In particular, in addition to the above, in the thin film magnetic head of the embodiment, the insulating layer 30 is constructed so as to include the auxiliary insulating layer 14 extending from the position P1 while being adjacent to the gap layer 12 and specifying the throat height TH on the basis of the position PT, and the main insulating layer 15 extending from the position P2 receding from the position P1 while being adjacent to the auxiliary insulating layer 14, and covering the thin film coil 16. The write shield layer 40 is constructed so as to include the TH specifying layer 13 which extends to the position P1 while being adjacent to the gap layer 12, and the yoke layer 17 extending while being partly on the TH specifying layer 13. Consequently, as described above, the throat height TH is specified accurately and stably on the basis of the position P1 by the auxiliary insulating layer 14. Therefore, the throat height TH is determined with high precision, so that the recording characteristics can be assured.

In the embodiment, as shown in FIGS. 1A and 1B, the auxiliary insulating layer 14 constructing a part of the insulating layer 30 interposes between the magnetic pole layer 20 and the thin film coil 16. As compared with the thin film magnetic head (refer to FIGS. 9A and 9B) of the comparative example in which the auxiliary insulating layer 14 does not interpose between the magnetic pole layer 20 and the thin film coil 16, the distance between the magnetic pole layer 20 and the thin film coil 16 is larger. That is, the magnetic pole layer 20 is set to be farther from the thin film coil 16. In this case, when the thin film coil 16 is conducted and heat is generated, conduction of the heat to the magnetic pole layer 20 is suppressed by the presence of the auxiliary insulating layer 14. Consequently, as compared with the thin film magnetic head of the comparative example, the amount of heat conduction to the main magnetic pole layer 10 exposed in the air bearing surface 50 decreases. Therefore, in the embodiment of the invention, occurrence of a projection defect of the main magnetic pole layer 10, that is, a trouble of unintentional projection from the air bearing surface 50 due to thermal expansion of the main magnetic pole layer 10 can be suppressed.

Figures 12A, 12B:
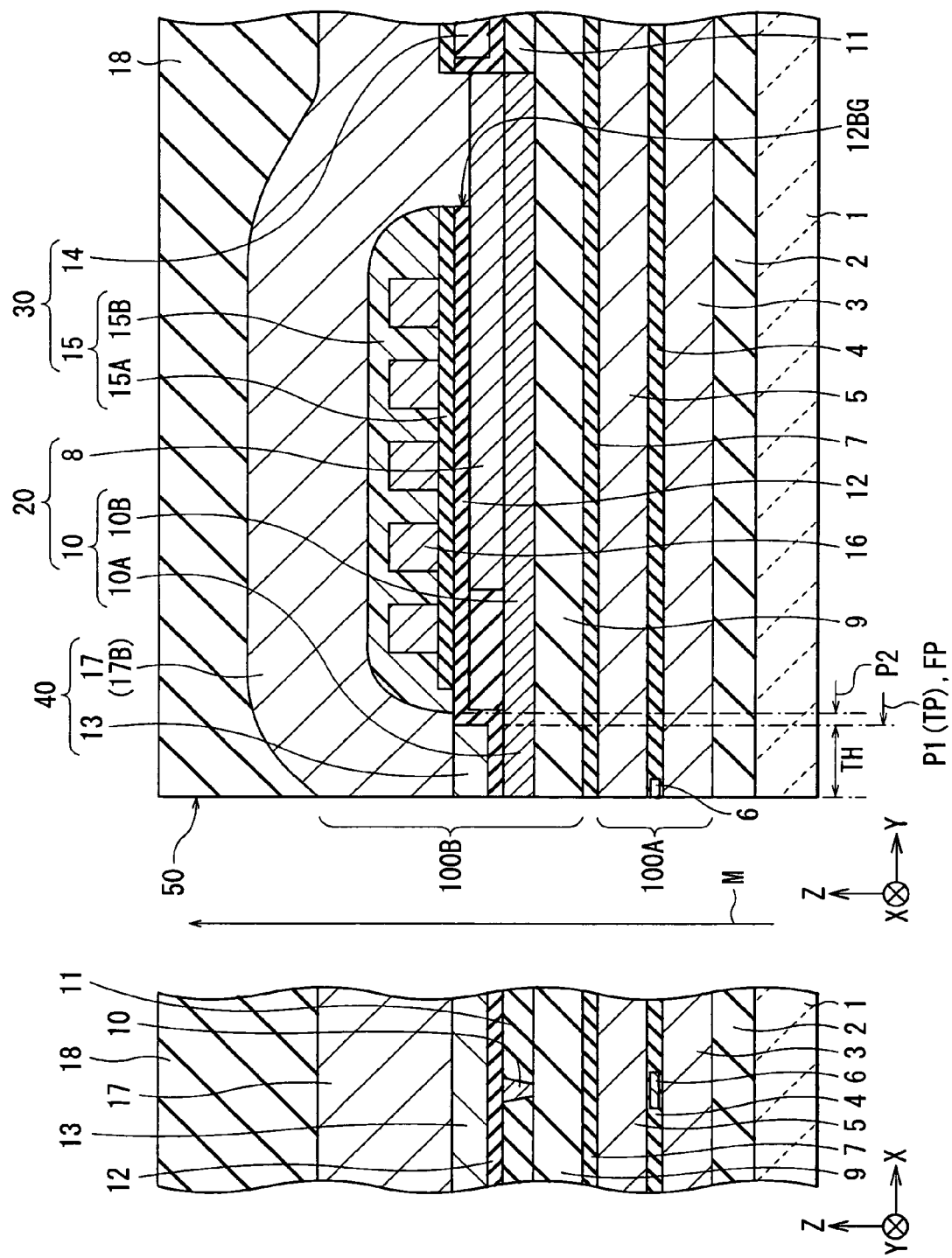
FIGS. 12A and 12B are cross sections illustrating a modification of the configuration of the thin film magnetic head according to the embodiment of the invention.

In the embodiment, as shown in FIG. 1B, the magnetic pole layer 20 is constructed so that the auxiliary magnetic pole layer 8 is disposed on the leading side and the main magnetic pole layer 10 is disposed on the trailing side. However, the invention is not always limited to the configuration. For example, as shown in FIGS. 12A and 12B, the magnetic pole layer 20 may be constructed so that the auxiliary magnetic pole layer 8 is disposed on the trailing side and the main magnetic pole layer 10 is disposed on the leading side. The thin film magnetic head shown in FIGS. 12A and 12B has a configuration similar to that of the thin film magnetic head shown in FIGS. 1A and 1B except that, for example, in place of the configuration that the periphery is buried by the insulating layer 9, the auxiliary magnetic pole layer 8 is disposed so as to occupy a part of the area where the auxiliary insulating layer 14 shown in FIG. 1B is disposed and the area where the yoke layer portion 17A is disposed, the gap layer 12 is provided on both the auxiliary insulating layer 14 and the auxiliary magnetic pole layer 8, and the yoke layer 17 in the write shield layer 40 includes only the yoke layer portion 17B. In the thin film magnetic head shown in FIGS. 12A and 12B, as compared with the thin film magnetic head shown in FIGS. 1A and 1B, the auxiliary magnetic pole layer 8 is disposed closer to the write shield layer 40. Consequently, even if a part of a magnetic flux for recording which is generated by the thin film coil 16 flows toward the air bearing surface 50 without flowing to the main magnetic pole layer 10 when the magnetic flux for recording is received by the auxiliary magnetic pole layer 8, the magnetic flux which does not flow into the main magnetic pole layer 10 is received by the write shield layer 40 so that emission of the magnetic flux from the air bearing surface 50 is suppressed. Therefore, unintended erasure of information, that is, occurrence of a trouble that information recorded on a recording medium is unintentionally overwritten due to direct emission of the magnetic flux received by the auxiliary magnetic pole layer 8 without passing through the main magnetic pole layer 10 can be suppressed.

In the embodiment, as shown in FIG. 1B, the main insulating layer 15 is constructed so as to include the main insulating layer portions 15A and 15B, but the invention is not always limited to the configuration. For example, the main insulating layer 15 may be constructed so as to include only the main insulating layer portion 15B without including the main insulating layer portion 15A.

Although the exposed surface 10M of the main magnetic pole layer 10 has the bilaterally-symmetrical inverted-trapezoidal shape in the embodiment, the invention is not always limited to the configuration. The plan-view shape of the exposed surface 10M can freely be changed.

The thin film magnetic head according to the embodiment of the invention and the method of manufacturing the same has been described above.

Figure 13:
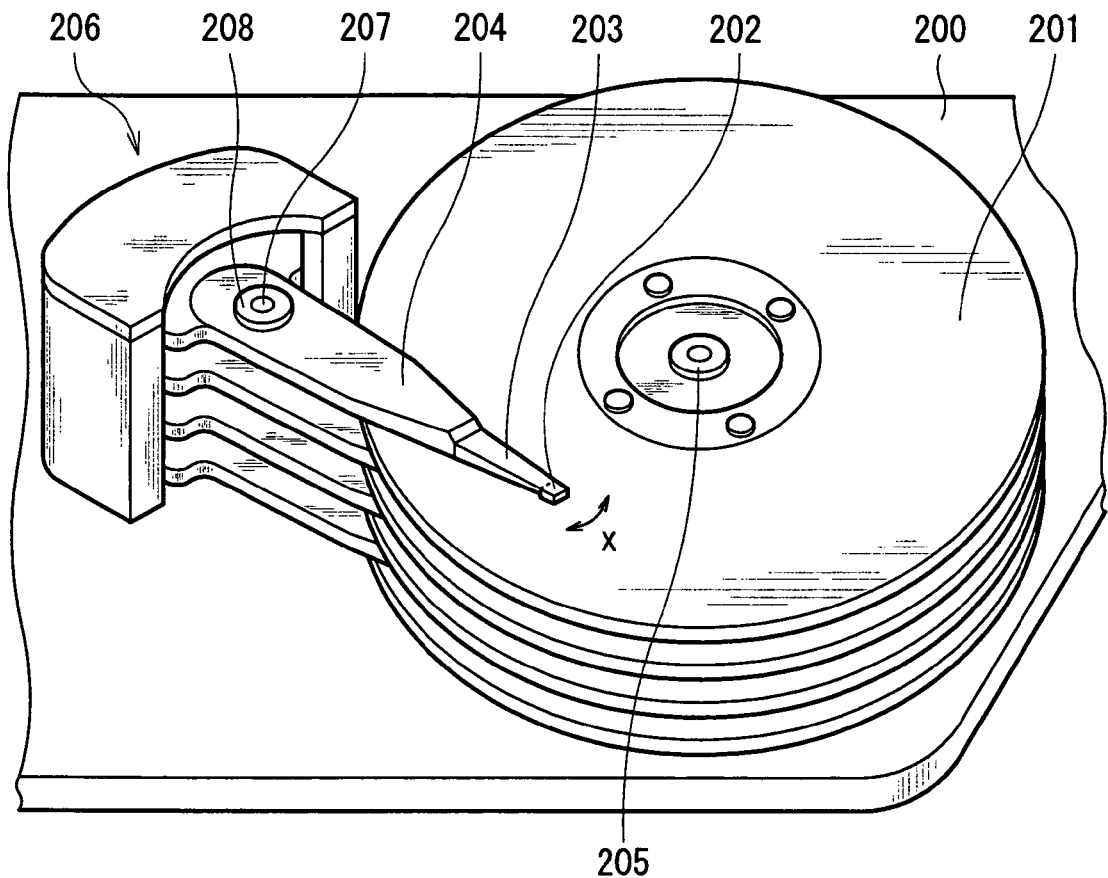
FIG. 13 is a perspective view showing the configuration of a magnetic recording apparatus on which the thin film magnetic head of the invention is mounted.
Figure 14:
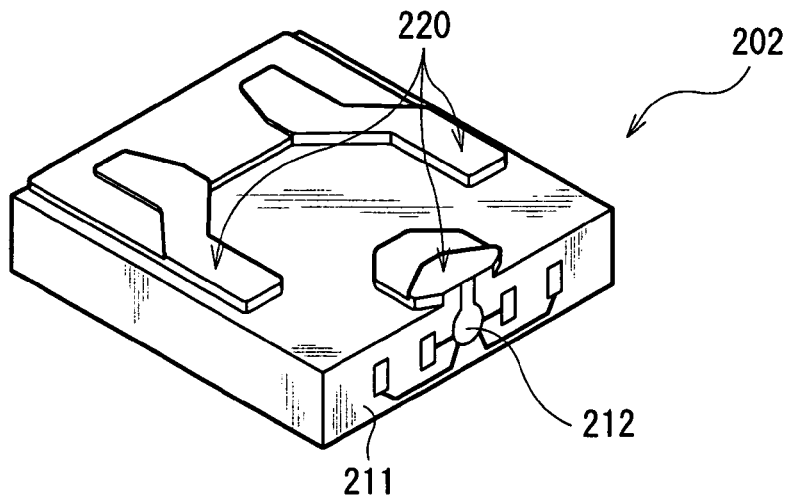
FIG. 14 is an enlarged perspective view showing the configuration of a main portion of the magnetic recording apparatus shown in FIG. 13.

Next, with reference to FIGS. 13 and 14, the configuration of a magnetic recording apparatus on which the thin film magnetic head of the invention is mounted will be described. FIG. 13 shows a configuration in perspective view of the magnetic recording apparatus. FIG. 14 is an enlarged perspective view showing the configuration of a main portion of the magnetic recording apparatus. The magnetic recording apparatus is an apparatus on which the thin film magnetic head described in the foregoing embodiment is mounted and is, for example, a hard disk drive.

The magnetic recording apparatus has, as shown in FIG. 13, for example in a casing 200, a plurality of magnetic disks (for example, hard disks) 201 as recording media on which information is magnetically recorded, a plurality of suspensions 203 disposed in correspondence with the magnetic disks 201 and each supporting one end portion of a magnetic head slider 202, and a plurality of arms 204 supporting the other end portions of the suspensions 203. The magnetic disk 201 is rotatable around a spindle motor 205 fixed to the casing 200 as a center. The arms 204 connected to a driving unit 206 as a power source, are swingable via a Bearing 208 around a fixed axis 207 that is fixed to the casing 200 as a center. The driving unit 206 includes, for example, a driving source such as a voice coil motor. The magnetic recording apparatus is, for example, a model in which the plurality of arms 204 can integrally swing around the fixed axis 207 as a center. FIG. 13 shows the casing 200 in a partially cut away view so that the internal structure of the magnetic recording apparatus can be easily seen.

The magnetic head slider 202 has, as shown in FIG. 14, a configuration where a thin film magnetic head 212 executing both of recording and reproducing processes is mounted to one of surfaces of a substrate 211 having an almost rectangular parallelepiped structure made of a non-magnetic insulating material such as AlTiC. The substrate 211 includes, for example, a surface (an air bearing surface 220) having roughness for decreasing air resistance which occurs when the arms 204 swing. To another surface orthogonal to the air bearing surface 220 (the surface on the right front side in FIG. 14), the thin film magnetic head 212 is mounted. The thin film magnetic head 212 has the configuration described in the foregoing embodiment. The magnetic head slider 202 floats from the recording surface of the magnetic disk 201 by using an air current generated between the recording surface of the magnetic disk 201 (the surface facing the magnetic head slider 202) and the air bearing Surface 220 when the magnetic disk 201 rotates at the time of recording or reproducing of information. FIG. 14 shows a state where the magnetic recording apparatus shown in FIG. 13 is turned upside down so that the structure on the air bearing surface 220 side of the magnetic head slider 202 can be easily seen.

In the magnetic recording apparatus, at the time of recording or reproducing information, by swing of the arm 204, the magnetic head slider 202 moves to a predetermined region (recording region) in the magnetic Disk 201. When a current is passed to the thin film magnetic head 212 in a state where the thin film magnetic head 212 faces the magnetic disk 201, the thin film magnetic head 212 operates on the basis of the operation principle described in the embodiment, thereby performing recording or reproducing process on the magnetic disk 201.

Since the thin film magnetic head 212 having the above-described structural features is mounted on the magnetic recording apparatus, the throat height TH is determined accurately and stably in the thin film magnetic head 212. Therefore, the thin film magnetic head 212 of which the throat height TH is determined with high precision is mounted, so that recording characteristics can be assured.

Since the other configuration, operation, action, effect, modification, and the like of the thin film magnetic head 212 mounted on the magnetic recording apparatus are similar to those of the forgoing embodiment, their description will not be repeated.

Next, an example of the invention will now be described.

By using the method of manufacturing the thin film magnetic head described in the foregoing embodiment (hereinbelow, simply called "the method of manufacturing the thin film magnetic head of the invention" ), an insulating layer was formed so as to include an auxiliary insulating layer and a main insulating layer and a write shield layer was formed so as to include a TH specifying layer and a yoke layer, thereby manufacturing a thin film magnetic head (refer to FIGS. 1A and 1B to FIG. 3). After that, the thin film magnetic head was mounted in the magnetic recording apparatus (Reference to FIGS. 13 and 14), and recording process was performed.

The recording characteristics of the thin film magnetic head mounted on the magnetic recording apparatus were examined and the following results were obtained. First, when "magnetic field intensity H $(10^3/(4\pi)$A/m=Oe)" and "magnetic field intensity gradient HG $([10^3/(4 \pi) $A/m]/nm=Oe/nm]" of the perpendicular magnetic field were examined while changing "thickness T (μm; refer to FIG. 1B)" of the TH specifying layer in the write shield layer (thickness T=0.30 μm, 0.45 μm, 0.60 μm), the results shown in Table 1 were obtained. Table 1 shows the correlation between the recording characteristics of the thin film magnetic head and the thickness T of the TH specifying layer. At the time of examining the correlation between the recording characteristics of the thin film magnetic head and the thickness T of the TH specifying layer, "recession distance L (μm; refer to FIG. 1B)" of the main insulating layer from the air bearing surface was fixed to 0.40 μm. The thickness T of the TH specifying layer corresponds to the thickness of the auxiliary insulating layer.

TABLE 1

| | Thickness T (μm) | | |
|---|---|---|---|
| | 0.30 | 0.45 | 0.60 |
| Magnetic field intensity H ($10^3/(4\pi)$A/m) | 8797 | 8880 | 8832 |
| Magnetic field intensity gradient HG ($[10^3/(4\pi)$A/m]/nm) | 125 | 127 | 126 |

As understood from the result shown in Table 1, when the thickness T was changed to 0.30 μm, 0.45 μm, and 0.60 μm, sufficient magnetic field intensity H of $8797\times10^3/(4\pi)$A/m to $8880\times10^3/(4\pi)$A/m was obtained and steep magnetic field intensity gradient HG of $125\times[10^3/(4\pi)$A/m]/nm to $127\times[10^3/(4\pi)$A/m]/nm was obtained. That is, even when the thickness T was changed, sufficient magnetic field intensity H and steep magnetic field intensity gradient HG were stably obtained. Consequently, in the method of manufacturing the thin film magnetic of the invention, by forming the insulating layer so as to include the auxiliary insulating layer and the main insulating layer and forming the write shield layer so as to include the TH specifying layer and the yoke layer, sufficient magnetic field intensity and steep magnetic field intensity gradient were assured. Thus, it was confirmed that, by determining the throat height with high precision, the recording characteristics can be assured.

Subsequently, "magnetic field intensity H($10^3/(4\pi)$A/m=Oe)" and "magnetic field intensity gradient HG ($[10^3/(4\pi)$A/m]/nm=Oe/nm)" of perpendicular magnetic field were examined while changing "recession distance L (μm; refer to FIG. 1B)" of the main insulating layer from the air bearing surface (recession distance L=0.35 μm, 0.40 μm, and 0.45 μm), and the results shown Table 2were obtained. Table 2shows the correlation between the recording characteristics of the thin film magnetic head and the recession distance L of the main insulating layer. At the time of examining the correlation between the recording characteristics of the thin film magnetic head and the recession distance L of the main insulating layer, "the thickness T (μm; refer to FIG. 1B)" of the TH specifying layer was fixed to 0.45 μm. The recession distance L of the main insulating layer corresponds to the length of the portion connected to the TH specifying layer of the yoke layer in the write shield layer.

TABLE 2

| | Recession distance L (μm) | | |
|---|---|---|---|
| | 0.35 | 0.40 | 0.45 |
| Magnetic field intensity H ($10^3/(4\pi)$A/m) | 8894 | 8880 | 8881 |
| Magnetic field intensity gradient HG ($[10^3/(4\pi)$A/m]/nm) | 127 | 127 | 127 |

As understood from the results shown in Table 2, when the recession distance L was changed to 0.35 μm, 0.40 μm and 0.45 μm, sufficient magnetic field intensity H of $8880\times10^3/(4\pi)$A/m to $8894\times10^3/(4\pi)$A/m was obtained and steep magnetic field intensity gradient HG of $127\times[10^3/(4\pi)$A/m]/nm was obtained. That is, also in the case where the recession distance L was changed, sufficient magnetic field intensity H and steep magnetic field intensity gradient HG were stably obtained. Consequently, it was confirmed that, in the method of manufacturing the thin film magnetic head of the invention, by forming the insulating layer so as to include the auxiliary insulating layer and the main insulating layer and forming the write shield layer so as to include the TH specifying layer and the yoke layer, the recording characteristics can be assured by determining the throat height with high precision.

Although the invention has been described above by the embodiment and the example, the invention is not limited to the embodiment and the example but can be variously modified. Concretely, for example, although the case of applying the invention to a composite thin film magnetic head has been described in the foregoing embodiment and the example, the invention is not always limited to the case but can be also applied to, for example, a recording-only thin film magnetic head having an inductive magnetic transducer for writing and a thin film magnetic head having an inductive magnetic transducer for recording and reproduction. Obviously, the invention can be also applied to a thin film magnetic head of a structure obtained by stacking an element for writing and an element for reading in the reverse order.

The thin film magnetic head according to the invention, the method of manufacturing the same, and the magnetic recording apparatus can be applied to, for example, a hard disk drive for magnetically recording information onto a hard disk, and the like.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising:
   a thin film coil for generating a magnetic flux;
   a magnetic pole layer extending rearward from a recording-medium-facing surface that faces a recording medium traveling in a medium travel direction and generating a magnetic field for magnetizing the recording medium in a direction orthogonal to the face of the recording medium on the basis of the magnetic flux generated by the thin film coil;
   a magnetic shield layer which extends rearward from the recording-medium-facing surface so as to be separated from the magnetic pole layer by a gap layer on the side close to the recording-medium-facing surface and connected to the magnetic pole layer via a back gap on the side far from the recording-medium-facing surface, the magnetic shield layer including a first magnetic shield layer portion extending rearward from the recording-medium-facing surface to a first position while being adjacent to the gap layer, and a second magnetic shield layer portion extending rearward from the recording-medium-facing surface to at least the back gap while extending partially on the first magnetic shield layer portion; and
   an insulating layer including a first insulating layer portion which extends rearward from the first position while being adjacent to the gap layer, constructs a flat surface together with the first magnetic shield layer portion, and specifies a throat height on the basis of the first position, and a second insulating layer portion which extends rearward from a second position that recedes from the first position while being adjacent to the flat surface in the first insulating layer portion, and covers the thin film coil wherein the second position is offset from the first position relative to the recording-medium-facing surface.

2. A method of manufacturing a thin film magnetic head comprising:
   a thin film coil for generating a magnetic flux; a magnetic pole layer extending rearward from a recording-medium-facing surface that faces a recording medium traveling in a medium travel direction and generating a magnetic field for magnetizing the recording medium in a direction orthogonal to the face of the recording medium on the basis of the magnetic flux generated by the thin film coil; a magnetic shield layer which extends rearward from the recording-medium-facing surface so as to be separated from the magnetic pole layer by a gap layer on the side close to the recording-medium-facing surface and connected to the magnetic pole layer via a back gap on the side far from the recording-medium-facing surface; and an insulating layer specifying a throat height and covering the thin film coil,
   wherein a step of forming the magnetic shield layer and the insulating layer comprises:
   a first step of forming a first magnetic shield layer portion constructing a part of the magnetic shield layer so as to extend rearward from the recording-medium-facing surface to a first position on the gap layer in which the back gap is provided while being adjacent to the gap layer;
   a second step of forming a first insulating layer portion constructing a part of the insulating layer so as to extend rearward from the first position while being adjacent to the gap layer, construct a flat surface together with the first magnetic shield layer portion, and specify the throat height on the basis of the first position;
   a third step of forming the insulating layer so as to include the first insulating layer portion and a second insulating layer portion by forming the second insulating layer portion constructing another part of the insulating layer so as to extend rearwardly from a second position that recedes from the first position, wherein the second position is offset from the first position relative to the recording-medium-facing surface while being adjacent to the flat surface in the first insulating layer portion and to cover the thin film coil; and
   a fourth step of forming the magnetic shield layer so as to include the first magnetic shield layer portion and a second magnetic shield layer portion by forming the second magnetic shield layer portion constructing another part of the magnetic shield layer so as to extend rearward from the recording-medium-facing surface to at least the back gap while being on the first magnetic shield layer portion.

3. A method of manufacturing a thin film magnetic head according to claim 2, wherein the second step comprises:
   a step of forming a pre-insulating layer so as to cover the first magnetic shield layer portion and the gap layer in the periphery of the first magnetic shield layer portion; and
   a step of forming the first insulating layer portion by planarizing the pre-insulating layer and the first magnetic shield layer portion by polishing.

4. A method of manufacturing a thin film magnetic head according to claim 2, wherein the first insulating layer portion is formed so as to include an inorganic insulating material in the second step, and
   the second insulating portion is formed so as to include a material showing flowability when heated in the third step.

5. A method of manufacturing a thin film magnetic head according to claim 2, wherein the third step includes:
- a step of forming a base insulating layer portion constructing a part of the second insulating layer portion on the flat surface in the first insulating layer portion;
- a step of forming the thin film magnetic coil on the base insulating layer portion; and
- a step of forming the second insulating layer portion so as to include the base insulating layer portion and a covering insulating layer portion by forming the covering insulating layer portion constructing another part of the second insulating layer portion so as to cover the thin film coil and the base insulating layer portion in the periphery of the thin film coil.

6. A magnetic recording apparatus on which a recording medium traveling in a medium travel direction and a thin film magnetic head for performing magnetic process on the recording medium are mounted,
the thin film magnetic head comprising:
- a thin film coil for generating a magnetic flux;
- a magnetic pole layer extending rearward from a recording-medium-facing surface that faces a recording medium traveling in a medium travel direction and generating a magnetic field for magnetizing the recording medium in a direction orthogonal to the face of the recording medium on the basis of the magnetic flux generated by the thin film coil;
- a magnetic shield layer which extends rearward from the recording-medium-facing surface so as to be separated from the magnetic pole layer by a gap layer on the side close to the recording-medium-facing surface and connected to the magnetic pole layer via a back gap on the side far from the recording-medium-facing surface, the magnetic shield layer including a first magnetic shield layer portion extending rearward from the recording-medium-facing surface to a first position while being adjacent to the gap layer, and a second magnetic shield layer portion extending rearward from the recording-medium-facing surface to at least the back gap while extending partially on the first magnetic shield layer portion; and
- an insulating layer including a first insulating layer portion which extends rearward from the first position while being adjacent to the gap layer, constructs a flat surface together with the first magnetic shield layer portion, and specifies a throat height on the basis of the first position, and a second insulating layer portion which extends rearward from a second position receding from the first position while being adjacent to the flat surface in the first insulating layer portion, and covers the thin film coil wherein the second position is offset from the first position relative to the recording-medium-facing surface.

* * * * *